United States Patent
Millett et al.

(10) Patent No.: US 7,644,082 B2
(45) Date of Patent: Jan. 5, 2010

(54) ABBREVIATED INDEX

(75) Inventors: Ronald P. Millett, Orem, UT (US);
Dillon K. Inouye, Provo, UT (US)

(73) Assignee: Perfect Search Corporation, Provo, UT (US)

(*) Notice: Subject to any disclaimer, the term of this patent is extended or adjusted under 35 U.S.C. 154(b) by 240 days.

(21) Appl. No.: 11/681,673

(22) Filed: Mar. 2, 2007

(65) Prior Publication Data
US 2008/0059462 A1 Mar. 6, 2008

Related U.S. Application Data

(60) Provisional application No. 60/779,214, filed on Mar. 3, 2006.

(51) Int. Cl.
*G06F 17/30* (2006.01)

(52) U.S. Cl. ............................... 707/6; 707/3

(58) Field of Classification Search ............ 707/3–6, 707/200
See application file for complete search history.

(56) References Cited

U.S. PATENT DOCUMENTS

| | | | |
|---|---|---|---|
| 4,961,139 A | 10/1990 | Hong et al. |
| 5,530,854 A | 6/1996 | Emery et al. |
| 5,701,459 A | 12/1997 | Millett |
| 5,737,734 A | 4/1998 | Schultz |
| 5,761,652 A | 6/1998 | Wu |
| 5,799,312 A | 8/1998 | Rigoutsos |
| 6,018,733 A | 1/2000 | Kirsch et al. |
| 6,026,398 A | 2/2000 | Brown |
| 6,128,613 A | 10/2000 | Wong et al. |
| 6,216,123 B1 | 4/2001 | Robertson et al. |
| 6,233,571 B1 | 5/2001 | Egger et al. |
| 6,473,729 B1 | 10/2002 | Gastaldo et al. |
| 6,584,458 B1 | 6/2003 | Millett et al. |

(Continued)

FOREIGN PATENT DOCUMENTS

WO    WO2007082212 A2    7/2007

(Continued)

OTHER PUBLICATIONS

U.S. Appl. No. 11/328,863, filed Jan. 10, 2006, Millett.

(Continued)

*Primary Examiner*—Mohammad Ali
*Assistant Examiner*—Huawen Peng
(74) *Attorney, Agent, or Firm*—Workman Nydegger

(57) ABSTRACT

Abbreviated index of parameter patterns. An abbreviated index includes indicators that a parameter pattern may be in a set of parameter patterns. To create the abbreviated index, indicators for overlapping parameter patterns of a given parameter pattern are placed in the index. Different patterns may have the same indicator, so the abbreviated index does not necessarily give an absolute indication of the presence of a parameter pattern in the set of parameter patterns, but rather may give an indication of the possible inclusion of a parameter pattern. The use of indicators for overlapping patterns can be used to increase confidence as to the existence of a given parameter pattern in the set of parameter patterns. The absence of an indicator for a parameter pattern or an overlapping parameter pattern will indicate with certainty that the parameter pattern is not present in the set of parameter patterns.

17 Claims, 8 Drawing Sheets

U.S. PATENT DOCUMENTS

| | | | | |
|---|---|---|---|---|
| 6,584,465 | B1* | 6/2003 | Zhu et al. | 707/6 |
| 6,718,325 | B1* | 4/2004 | Chandra | 707/6 |
| 6,772,141 | B1* | 8/2004 | Pratt et al. | 707/3 |
| 6,785,677 | B1* | 8/2004 | Fritchman | 707/6 |
| 6,804,664 | B1 | 10/2004 | Hartman et al. | |
| 6,947,931 | B1 | 9/2005 | Bass et al. | |
| 6,985,904 | B1 | 1/2006 | Kaluskar et al. | |
| 7,139,753 | B2 | 11/2006 | Bass et al. | |
| 7,181,438 | B1 | 2/2007 | Szabo | |
| 7,266,553 | B1 | 9/2007 | Anderson et al. | |
| 2002/0099536 | A1 | 7/2002 | Bordner et al. | |
| 2004/0225643 | A1 | 11/2004 | Alpha et al. | |
| 2004/0260694 | A1 | 12/2004 | Chaudhuri et al. | |
| 2005/0108394 | A1 | 5/2005 | Braun et al. | |
| 2005/0131872 | A1 | 6/2005 | Calbucci et al. | |
| 2006/0036649 | A1* | 2/2006 | Simske et al. | 707/200 |
| 2006/0106793 | A1 | 5/2006 | Liang | |
| 2006/0235843 | A1 | 10/2006 | Musgrove et al. | |
| 2007/0027864 | A1 | 2/2007 | Collins et al. | |
| 2007/0033165 | A1 | 2/2007 | Sheinwald et al. | |
| 2007/0073894 | A1 | 3/2007 | Erickson et al. | |
| 2007/0106876 | A1 | 5/2007 | Goswami | |
| 2007/0156677 | A1 | 7/2007 | Szabo | |
| 2007/0203898 | A1 | 8/2007 | Carmona | |
| 2007/0250494 | A1 | 10/2007 | Peoples et al. | |
| 2009/0019038 | A1 | 1/2009 | Millett | |

FOREIGN PATENT DOCUMENTS

| | | | |
|---|---|---|---|
| WO | WO2007103815 | A2 | 9/2007 |

OTHER PUBLICATIONS

U.S. Appl. No. 60/779,214, filed Mar. 3, 2006, Millett.
Manning, Christopher D. and Schutze, Hinrich Foundations of Statistical Natural Language Processing, The MIT Press, Cambridge Massachusetts, May 1999 (pp. 151, 158, 192-194, 377 and 532).
Mitra, Mandar et al. "An Analysis of Statistical and Syntactic Phrases", Jun. 1997.
Possas, Bruno et al. "Set-Based Vector Model: An Efficient Approach for Correlation-Based Ranking", Oct. 2005.
Office Action mailed Feb. 20, 2008 cited in related case U.S. Appl. No. 11/328,863.
U.S. Appl. No. 12/143,432, filed Jun. 20, 2008, Millett.
U.S. Appl. No. 12/143,441, filed Jun. 20, 2008, Millett.
U.S. Appl. No. 11/847,688, filed Aug. 30, 2007, Millett, et al.
U.S. Appl. No. 11/847,869, filed Aug. 30, 2007, Millett, et al.
U.S. Appl. No. 11/847,784, filed Mar. 30, 2007, Millett, et al.
Ceglowski, Maciej "Using Bloom Filters", Apr. 8, 2004, http://www.perl.com/pub/a/2004/04/08/bloom_filters.html, 4 pages.

* cited by examiner

FIG. 1

Bit array 102:

| 0 | 1 | 2 | 3 | 4 | 5 | 6 | 7 | 8 | 9 | a | B | C | D | E | F | 10 | 11 | 12 | 13 | 14 | 15 | 16 | 17 | 18 | 19 | 1a | 1b | 1c | 1d | 1e | 1f |
|---|---|---|---|---|---|---|---|---|---|---|---|---|---|---|---|----|----|----|----|----|----|----|----|----|----|----|----|----|----|----|----|
| 0 | 0 | 0 | 0 | 0 | 1 | 0 | 0 | 0 | 1 | 0 | 1 | 0 | 1 | 0 | 0 | 0  | 0  | 0  | 0  | 0  | 1  | 1  | 0  | 1  | 1  | 0  | 0  | 1  | 0  | 0  | 1  |
| 0 | 0 | 1 | 0 | 0 | 0 | 0 | 0 | 0 | 0 | 0 | 0 | 0 | 0 | 0 | 0 | 0  | 0  | 0  | 0  | 0  | 0  | 1  | 0  | 0  | 0  | 0  | 0  | 1  | 0  | 0  | 0  |

104, 106

|  |  |  | Hash | Last 8 bits of hash | Last 5 bits of hash | Hex of last 5 bits |
|---|---|---|---|---|---|---|
|  |  | fox | 40b8636cf497235c | 01011100 | 11100 | 1C |
|  | red |  | 100519ba181728d8 | 11011000 | 11000 | 18 |
|  | red | fox | f9d6824a13b3ed25 | 00100101 | 00101 | 5 |
| quick |  |  | b249f6d0e2e948fc | 11111100 | 11100 | 1C |
| quick |  | fox | ec45e8c4c06bed36 | 00110110 | 10110 | 16 |
| quick | red |  | b0cc990de2fd626d | 01101101 | 01101 | D |
| quick | red | fox | 1c1539fdf2306635 | 00110101 | 10101 | 15 |
| The |  |  | 1a6a89be20908b63 | 01100011 | 00011 | 3 |
| The |  | fox | 679e70ee245a112d | 00101101 | 01101 | D |
| The | red |  | 0ffc1785181760df | 11011111 | 11111 | 1F |
| The | red | fox | 56cf1314b42ff1d1 | 11010001 | 10001 | 11 |
| The | quick |  | 00bf1348c0e06f58 | 01011000 | 11000 | 18 |
| The | quick | fox | 272dc1de87ccca95 | 10010101 | 10101 | 15 |
| The | quick | red | fe417685c0f445c9 | 11001001 | 01001 | 9 |
| The | quick | red | e6305123b5974196 | 10010110 | 10110 | 16 |

110  112  114  116  118

300

← 602   604 ↓

| Word  | identifier |
|-------|-----------|
| The   | 00100     |
| fox   | 00101     |
| quick | 00110     |
| red   | 00111     |

← 606

|      |       |     |     |              |
|------|-------|-----|-----|--------------|
|      |       | red | fox | 000000110111 |
|      | quick |     | fox | 000000110110 |
|      | quick | red |     | 000000111110 |
|      | quick | red | fox | 000111011110 |
| The  |       |     | fox | 000000110010 |
| The  |       | red |     | 000000111010 |
| The  |       | red | fox | 000111010110 |
| The  | quick |     |     | 000000111000 |
| The  | quick |     | fox | 000111010100 |
| The  | quick | red |     | 000111110100 |
| The  | quick | red | fox | 111101101100 |

ABBREVIATED INDEX

CROSS-REFERENCE TO RELATED APPLICATIONS

This application claims the benefit of U.S. Provisional Application No. 60/779,214, titled Abbreviated Index filed Mar. 3, 2006, which is incorporated herein by reference.

BACKGROUND

The computing industry has made it possible to access virtually any document or text with a computing device through the Internet or other computing network.

Although the computing processes required to store and retrieve electronic documents are well known, the sheer volume of documents and data stored in some databases can still make it difficult to properly index and find the desired content in a timely fashion. This is particularly true when considering that many databases contain documents with similar or identical content, thereby increasing the difficulty and processing required to distinguish between the various documents.

To facilitate the retrieval of electronic content from a database, several types of search engines and indexes have been developed. Initially, traditional databases were developed with fields of information that could only be searched through a rigid alphabetically ordering of associated fields, such as a last name field. Later, full text indexing was developed to provide greater searching flexibility. With a full text index all words are indexed and can therefore be searched for within a document or record. With full text indexing, it is also possible to simultaneously or sequentially search for a plurality of search terms within the indexed documents and to hopefully improve the accuracy of a search.

While full text indexing and modified field indexing have provided significant improvements over traditional indexes that only permitted rigid alphabetical searching of fields, there is still a significant need for improvement in searching technology. This is true, not only for Internet and traditional databases, but for any computing process or application in which data is retrieved from a repository of any type.

Bottlenecks that slow down the searching processes, for example, can be created by the limitations of computer hardware and connections. In particular, computer processors are limited in the number of calculations per time unit (e.g. calculations per second) that can be performed. Networks are also limited in the amount of data per time unit that can be transmitted across the network. Even storage devices are limited by the number of I/O operations that can be performed within a given time. Memory devices are also limited in the amount of information that can be stored at a given time.

Accordingly, in view of the processing limitations of computing devices, networks and storage, there is a significant need to provide new techniques for searching that will improve the overall speed and accuracy of a search and for reducing the computational expense of performing the search or other related computing process. Improving the speed and accuracy of searching processes would also result in a beneficially appreciable consumer experience.

Existing searching paradigms continue to be constrained by the philosophical approaches after which they were modeled. For example, existing search paradigms are designed to perform searching on demand or on-the-fly, only after the search query has been received. While this approach is somewhat logical, because it is unknown what to search for before the query is received, this approach delays computationally expensive processing which is noticeable to the consumer.

Existing philosophical approaches to searching also require a significant amount of irrelevant processes to ensure that the search is comprehensive. In effect, the existing searching techniques require a very deliberate and sequential sweep of the data repositories that are being searched, by looking in every 'nook and cranny', if you will, to help ensure the search is comprehensive. This blanket searching, however, wastes a lot of processing time and expense looking for the data in places were the data is unlikely to be found. However, because the existing searching techniques are directed to identifying where the data is, they fail to appreciate the value of knowing where the data is probably not.

In view of the foregoing, it is clear that the industry is in need of new approaches to searching for data.

SUMMARY

Embodiments of the present invention are directed to methods, systems and computing devices for applying novel searching techniques to improve searching speed and accuracy.

In some embodiments, some searching processes are performed prior to receiving a search request. One such searching process can include creating a prefiltered index or gatekeeper type data structure that can be referenced during a search to identify probabilities where data is likely to not be found. This type of index is distinguished from full-text indexes that merely identify where content is. The prefiltered index can be created though hashing techniques, as described herein, alone, or in combination with any of the other techniques described herein, such as but not limited to the use of tuples.

During a search the prefiltered index can direct the search engine to avoid searching in repositories or computing clusters where the data is likely to not be found. This way, the computing resources are more effectively routed to the clusters and repositories where the data is likely to be found. At this point, a combination of full-text indexes or any other types of indexes and algorithms can be applied to the remaining clusters to search for the data.

It will be appreciated that by performing the prefilter processing, the speed of a search can be significantly improved. Not only are fewer searching processes being performed, but fewer processes have to be performed after the search is requested by the consumer, significantly improving the speed of the search experienced by the consumer.

It will also be noted that the foregoing approach is a significant divergence from existing searching paradigms. In particular, the present embodiments place a premium on knowing where not to search, rather than performing a comprehensive sweep of the database or at least all of the clusters containing data corresponding to the database.

The data stored in the various computing clusters can be divided into any desired size, providing flexibility and control over the appreciable benefits in speed and accuracy of the new and novel searching techniques described herein.

Embodiments of the present invention also utilize various overlapping dimensions and patterns to improve the searching accuracy, not only during the actual search, but prior to performing the search, such as during the prefiltering processes referenced above and described herein.

In summary, embodiments of the present invention can help identify where to not search and where to search, prior to even performing the search, such that the search is not a complete blanket search (looking into every nook and cranny), but still providing the desired accuracy. In fact, the accuracy provided by the present invention can be as thorough or more thorough than existing search engines applying a comprehensive (look in every nook and cranny) approach. This is also particularly true, in view of the embodiments that apply overlapping patterns-including related term patterns, as described herein. Applying the techniques described herein can also provide a significant savings in time and processing resources expended during a search.

DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1 illustrates a data structure for an abbreviated look-up and a data structure including numerical representations of parameter patterns;

FIG. 6 illustrates another numerical representation formation process; and

DETAILED DESCRIPTION OF THE INVENTION

Figure 1A:
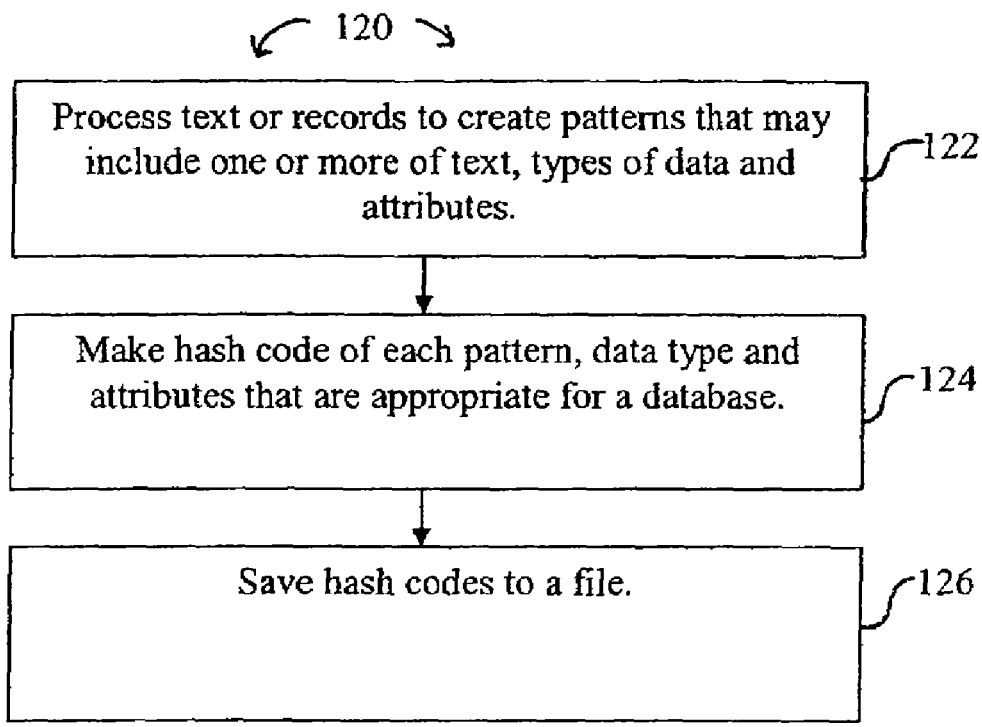
FIG. 1A illustrates a method of creating hash codes for parameter patterns.

As mentioned above, the present invention provides various advantages and benefits over the prior art searching paradigms by applying various combinations of prefiltering and overlapping patterns in various search dimensions.

In some embodiments the invention includes creating a filter, prefilter, or gatekeeper using a hash function on multiple intersecting and overlapping aspects or dimensions of data, as defined by patterns. The use of the prefilter can dramatically increase the probability of occurrence or absence from a database (or a database cluster) of data being searched for. The prefilters can be applied to any amount or size of defined data found in a single computer, a computing cluster or a plurality of local or distributed computing clusters.

The prefilter can be iteratively utilized by applying the various different overlapping dimensions and patterns to thereby prune areas of a search where it can be determined where the data is absent and should not be searched.

The prefilter or gatekeeper index can also be used to identify elements for searching a database for relevant data, even when the search string does not appear in the database as provided by the user, but which includes corresponding or related elements which may appear in the database.

In some embodiments the prefilter or gatekeeper indexes are created with hashing applied to enter an entire search space where reasoning operations are performed on information patterns. In these embodiments, hashes can be calculated for patterns and a portion of the hash can then be used as an index number to index the hashes and to reflect a possibility that the indexed pattern will actually appear in a full database. However, because identical hashes may be created from different patterns and/or when only a portion of the hash is used, the index may not always provide a definitive answer of what is in the database. Thus, when searches are performed against the index, a hash is calculated for search parameters and compared with the indexed hashes. If the hash is indexed, there is only a possibility that the pattern exists in the database. However, if the hash is not indexed, it is known with 100% accuracy that the pattern does not exist in the database, and thus expensive search and retrieval operations on the database can be avoided.

Using a prefiltered index, such as can be created with the hashing techniques described herein, it is possible to eliminate incorrect search parameters. This new searching paradigm is like entering a multidimensional world where eliminating noise is perceived as a valuable tool for obtaining a desired result, rather than necessarily requiring that a signal be found in the noise. If a hash is not indexed, these results are helpful because places to search have been very quickly eliminated. Nonetheless, when a hash is indexed, there is still a percentage confidence that the search parameters appear in the full database. In addition, when search parameters include elements that may exist, and elements that most definitely do not, as can be determined by calculating hashes of elements of a search parameter, some examples herein can provide an indication of the elements that do not exist in the database as well as an indication of the elements that just might.

Additionally interlocking an overlapping patterns such as boolean relationships, some intersecting, some set/subset, some disjoint, some duplicates of the same thing can be used to increase confidence that a search pattern exists or to eliminate a search pattern completely. Areas of information including the exact form, content, proximity, applicability, validity of the source, wild cards, field specifications, approximate matching, relevance, semantic/syntactic/phonetic patterns etc. can be used to increase confidence or ultimately eliminate search patterns.

One embodiment described herein relates to using a gatekeeper to prevent unnecessary operations from being performed by resources. Operations may include for example, microprocessor activities, storage I/O operations, network transmissions, and the like. Resources may include for example, processors, network routers and switches, disk drives, disk controllers, memory and memory controllers, and the like. For example in one embodiment, a gatekeeper data structure may be used as a look-up table to determine if operations should be performed at a particular system or not. A system may be a processor, single computer system, collections of computer system, clusters, etc. In other words, as used herein, a system may be of virtually any suitable scale. The gatekeeper data structure includes an indication of parameter and patterns of parameters available at a system. The parameters may include data structures or representations of data structures used in operations at the system.

For example in a search engine context or database context, parameters may include searchable data elements in a database. For example, parameters may include names, dates, locations, words, phrases, numbers, etc. Additionally, parameters may include in some embodiments, elements of other parameters in combination. For example, a search string parameter may include a surname parameter, a given name parameter, and a date. In particular, one embodiment may be used with a search engine that includes in a database a set of pre-combined parameter patterns.

Some operations may be search operations that attempt to locate one or more of the parameters in a data store such as a database. The gatekeeper data structure serves as a reference to determine whether or not parameters or combinations of parameter patterns exist within a database. If the parameters can be determined not to exist in the database, then expensive search operations do not need to be performed reducing the overall load on resources performing operations. Nonetheless, even when a particular parameter pattern in not indexed by the gatekeeper data structure, reference to the gatekeeper data structure may provide "clues" as to what parameters should be tried when elements of a parameter pattern are compared against the gatekeeper data structure.

In one embodiment each of the parameters is assigned a numerical representation. For example in the database context, a hash may be calculated for a parameter. The resultant hash number is the numerical representation. The gatekeeper data structure may include elements that correspond to all or a portion of the numerical representation of the parameters. Additionally parameters may be formed into patterns which may also be given a numerical representation that is, at least partially, included in the gatekeeper data structure. For example, in one embodiment a portions of a hash code, such as certain bits of the hash code, may be selected to be represented in the gatekeeper data structure.

As described herein, the embodiments of the present invention may comprise a special purpose or general-purpose computer. Embodiments within the scope of the present invention also include computer-readable media for carrying or having computer-executable instructions or data structures stored thereon. Computer-executable instructions comprise, for example, instructions and data which cause a general purpose computer, special purpose computer, or special purpose processing device to perform a certain function or group of functions.

The computer-readable media carrying the computer-executable instructions can be any available media that can be accessed by a general purpose or special purpose computer. By way of example, and not limitation, such computer-readable media can comprise computer-readable storage media, such as, but not limited to RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-readable media can also include computer-readable transmission media. For example, when information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Referring now to FIG. 1, a gatekeeper data structure 102 is illustrated, which in this example is a 32 bit binary number. The gatekeeper data structure 102, which comprises one example of the prefiltered index, may be embodied on computer readable media. In one embodiment, the gatekeeper data structure 102 may be embodied on physical memory in a computer system. The gatekeeper data structure 102 is shown with an index field 104 and a value field 106. Notably, the index field 104 in this example is shown for convenience of explanation. The value field 106, in this example, includes the 32 bit binary number stored in physical memory. The index field 104 includes hexadecimal index representations of each of the elements of the 32 bit number represented in the value field 106.

FIG. 1 further illustrates a numerical representation table 108. The numerical representation table 108 includes a parameter patterns field 110, a numerical representation field 112, a last 8 bits field 114, a last 5 bits field 116, and a hex of last 5 bits field 118.

The parameter patterns field 110 includes parameters and patterns of parameters on which operations can be performed. In this example, a data structure includes the text phrase "The quick red fox." In the example shown, combinations of individual words are represented as parameter patterns in the parameter patterns field 110. For example, "fox" is illustrated as a parameter. "red" is illustrated as a second parameter. "red fox" is illustrated as a combination of parameters. And so forth. The example shown here shows in the parameter patterns field 110 all possible combinations of individual words in the phrase "The quick red fox" when ordered in the original ordering.

It should be appreciated, however, that parameter patterns may also be created to represent different orderings and combinations. For example, other embodiments may include parameter patterns such as "quick The fox red." This may be used to perform searches when correct ordering of search terms in not necessarily needed or to increase the confidence that a particular set of search terms are present in a database. Additionally, patterns may be created to exclude common words such as "The." Further still, other parameter patterns may be included as illustrated in other examples illustrated herein below. Other types of patterns that can be applied to the prefiltered index or gatekeeper include, but are not limited to synonyms, homonyms, term attributes, proximities, term order, frequency, location, partial or incomplete terms, customized descriptions, and so forth.

In this example, the parameter patterns field 110 represents search strings that may be performed to locate elements in a database, such as a database including the phrase "The quick red fox."

The numerical representation field 112 in this example includes a numerical representation of each of the parameter patterns in the parameter patterns field 110. The numerical representations in this example are hash values of the parameter patterns. For example, a hash calculation may be performed for the parameter "fox." This hash calculation results in a number, which in this example is represented as a 64 bit hexadecimal number. Preferably, the hash calculation is performed using a good algorithm that results in a high percentage of unique numbers for calculations performed on different parameters and parameter patterns. For example, it is preferable that a hash calculation for "fox" results in a number that is different from the hash calculation for "red." The other fields in the numerical representation table 108 will be explained in more detail at a later point herein.

Referring once again to the gatekeeper data structure 102, each of the elements of the value field 106 represents a portion of a numerical representation 112 in the numerical representation table 108. Thus, the value field 106 contains a representation that a parameter pattern may be included in a set of parameters, such as a database, based on the calculated hash for the parameter pattern. In this example, when a bit is set or as used herein "true," i.e. "1" in an element of the value field

106, this is an indication that a parameter pattern may be included within a set of parameters.

For effective results, the gatekeeper data structure typically includes a number of elements that is equal to or greater than some multiple greater than 1 of the number of parameter patterns for a set of parameters. In the present example, 15 parameter patterns are included in the illustrated set of parameters. The gatekeeper data structure 102 corresponding to the set of parameters therefore includes 32 elements (i.e. the 32 binary digits of the 32 bit binary number in the gatekeeper data structure 102) which is a value greater than 2× of 15. Notably, the number of a multiplier (in this example 2) provides greater confidence that a parameter pattern is included in the set of parameters as the multiplier increases. For example, in the present 2× example, if a bit in the gatekeeper data structure is set indicating that a parameter pattern may be included in the set of parameters, the confidence is about 50%. If a 64 bit binary number representing a 4× multiplier is used to represent the gatekeeper data structure, confidence can be increased to about 75%. Similar increases in confidence can be achieved as the number of elements used to represent the gatekeeper data structure is increased. In one particular embodiment, where each of the numerical representations is unique and a sufficiently large gatekeeper data structure is used, a confidence of 100% can be achieved. This will be discussed in embodiments explained in more detail below.

Notably, the examples above use a data structure for the gatekeeper data structure 102 that is of a size that corresponds to numbers that can be represented by a set of binary bits. For example, a 2× setting of a four bit binary structure (up to 16 binary numbers) can be represented by a 32 bit data structure. A 2× setting of a 5 bit binary structure (up to 32 binary numbers) can be represented by a 64 bit data structure, and so forth.

However, it may be advantageous to limit the number of bits in the data structure to a number that does not correspond to exactly the number of bits that can be represented by a binary number. For example, consider the case where 65 parameter patterns are to be represented in a 2× data structure. This means that 130 bits must be included in the gatekeeper data structure. The binary number for 129 (0 may be includes in the 130 bits) is 10000001, an eight bit number. However, an eight bit number can represent as many as 256 bits. Thus, the gatekeeper data structure would be 256 bits even though only 130 bits are needed for the 2× structure. This can potentially be a huge waste of memory resources. Additionally, when there is a desire to tune confidence levels, the increased binary bits may cause difficulty in assigning appropriate confidence levels.

Thus, in some embodiments, a calculated number of bits may be set aside for the gatekeeper data structure 102 and selected portions of hash that exceed the set aside number will have their modulo entered into the gate keeper data structure. For example, consider the case where 130 bits are included in the gatekeeper data structure 102. A selected eight bits of a hash of a parameter pattern is equal to 134. The modulo, or remainder of 134/130 is 4. Thus, the bit corresponding to decimal 4 (which is the fifth least significant bit of the 130 bits of the gatekeeper data structure) can be set to index the selected portion of the hash corresponding to decimal 134. By controlling the number of bits in the gate keeper data structure 102, the models are less limited in the multipliers that can be used. Additionally, confidence levels can be more finely tuned than in some embodiments where the modulo is not used.

Referring once again to the gatekeeper data structure 102 and with particular emphasis on how the existence of parameter patterns are noted in the gatekeeper data structure 102, note that FIG. 1 includes the last five bits of hash field 116. The last five bits of hash field represents the last five binary bits of the hexadecimal number in the numerical representation field 112. Five bits are selected because that is the number of binary bits needed to represent 32 unique binary numbers, the number of binary bits in the gatekeeper data structure 102. Note that while the last five bits have been chosen in this example, embodiments are not limited to just the last bits. Any appropriate selection of bits can be used. In this example, so long as the same bits are used consistently to set bits in the gatekeeper data structure 102, effective filtering can be performed.

For illustration purposes, the last 8 bits of the numerical representation in the numerical representation field 112 can be calculated by converting the last two hexadecimal numbers to binary numbers. For example, for the parameter pattern "fox" in the parameter pattern patterns field 110, a hash of 40b8636cf497235c is calculated as shown in the numerical representation field 112. The last two hexadecimal numbers of the hash are 5c. These numbers represent the 8 bit binary number 01011100 as shown in the last 8 bits of hash field 114. By truncating the three most significant bits, the five least significant bits remain which are 11100 as shown in the last 5 bits of hash field 116. For simplicity in explanation, the last 5 bits can then be converted back to a hexadecimal number, which is 1c as shown in the hex of the last 5 bits field 118.

Thus the bit indexed by 1c in the index field 104 is set in the value field of the gatekeeper data structure 102. As illustrated, continuing this process for each of the parameter patterns in the parameter patterns field 110 results in the element in the value field 106 corresponding to the index numbers of 3, 5, 9, d, 11, 15, 16, 18, 1c, and 1f in the index field 104 of the gatekeeper data structure 102 are set. Notably, the gatekeeper data structure 102 includes a sampling of representations that can be maintained by the gatekeeper data structure. Other parameter and attributes can also be represented in the gatekeeper data structure. For example, various attributes may be associated with parameter patterns. For example, one attribute may specify that a parameter pattern is an exact phrase. This could be represented for example as "red fox –x." Another example may include an attribute that specifies that a parameter pattern is an ordered near phrase (as will be explained in more detail herein) such as by the representation "quick fox –n." Similarly, an attribute may be included that specifies the parameter pattern is an unordered near phrase such as by the representation "fox quick red –u." Other illustrative attributes could include items such as but not limited to type of record, e.g. book reports and/or reliability of the record or document. Separate gatekeeper data structures could be used for different attributes. Alternatively, the parameter patterns and their associated attributes may be indexed in a single array. Attributes may be part of the original parameter pattern. Alternatively, the attributes may be combined with pre-computed pattern hash values to make a new hash value. It will also be appreciated that various hashing algorithms can be used to create different hash values, and in some instances, to reduce the likelihood of collisions and to improve the prefiltered index accuracy and confidence.

Figure 1B:
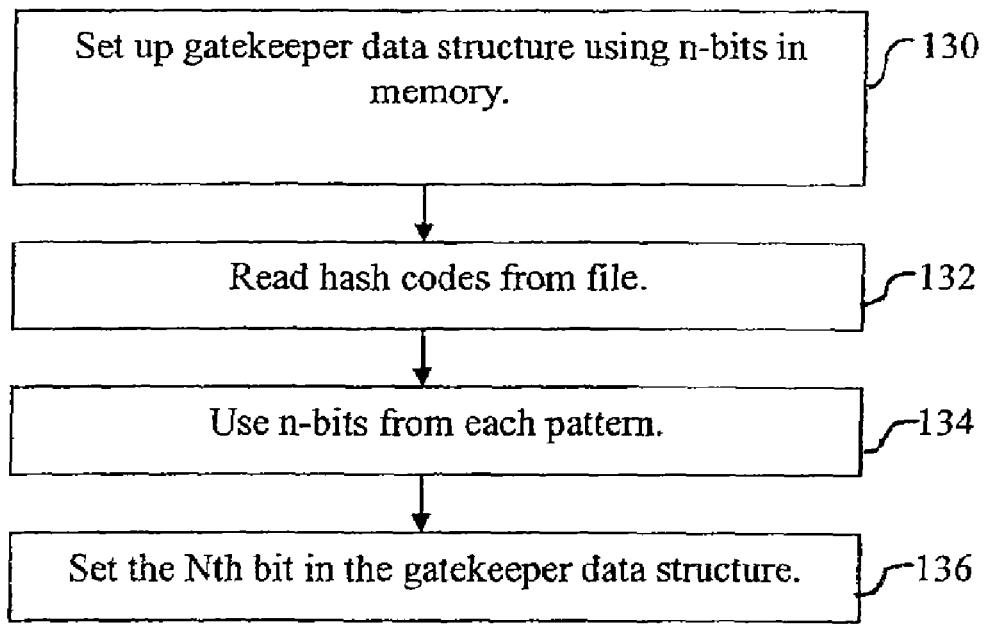
FIG. 1B illustrates a method of setting bits in a gatekeeper data structure.

Referring now to FIGS. 1A and 1B, two methods are shown which are useful in creating a gatekeeper data structure. FIG. 1A illustrates a method of creating a collection of hash codes for parameter patterns. The method 120 illustrated includes an act of processing text or records to create patterns that may include one or more of text, types of data, and/or attributes (act 122). For example, as described above, various patterns such as those illustrated in the parameter patterns column 110 in FIG. 1 may be created. Additionally, as noted above, attributes such as information describing a parameter pattern as an exact phrase, an ordered phrase, or other attributes may be included in a parameter pattern definition. Further, as described above, the type of data may be included in the parameter pattern. For example, attributes may be included that define the data has a report, an article, a scholarly work, and so forth.

The method 120 further includes an act of making hash code of each parameter pattern including as appropriate data type and attributes (act 124). Making a hash code may be performed in a number of ways including using hash codes common in the data security context. Additionally, various methods for creating hash code using unique identifiers or combinations of other calculated hash codes may be used as described later herein.

FIG. 1A further includes an act of saving hash codes to a file (act 126). As implied, hash codes calculated for parameter patterns can be stored to a file where they can be subsequently retrieved and used for creating entries in a gatekeeper data structure such as the gatekeeper data structure 102 shown in FIG. 1.

Attention is now directed to FIG. 1B, which illustrates a method 128 of setting bits in a gatekeeper data structure. The method 128 includes an act of setting up a gatekeeper data structure using a given number of bits in memory (act 130). For example, a given number of bits sufficient to allow for some multiple of the total number of parameter patterns may be reserved in physical memory for the gatekeeper data structure 102.

The method 128 further includes an act of a reading hash codes from a file (132). Reading hash code from a file may be performed by reading the hash codes stored in the file in the method 120 illustrated above. The method 128 further includes selecting n bits from each pattern. For example, as described above, a given number of bits of the hash code, such as five bits, may be used for representing a parameter pattern in the gatekeeper data structure 102.

Method 128 further illustrates an act of setting a bit corresponding to the selected bits from each pattern in the gatekeeper data structure (136). In this way, as is illustrated above, each of the parameters is represented in the gatekeeper data structure 122 by setting a bit in the gatekeeper data structure 102 corresponding to the bits selected from each pattern.

Figure 2:
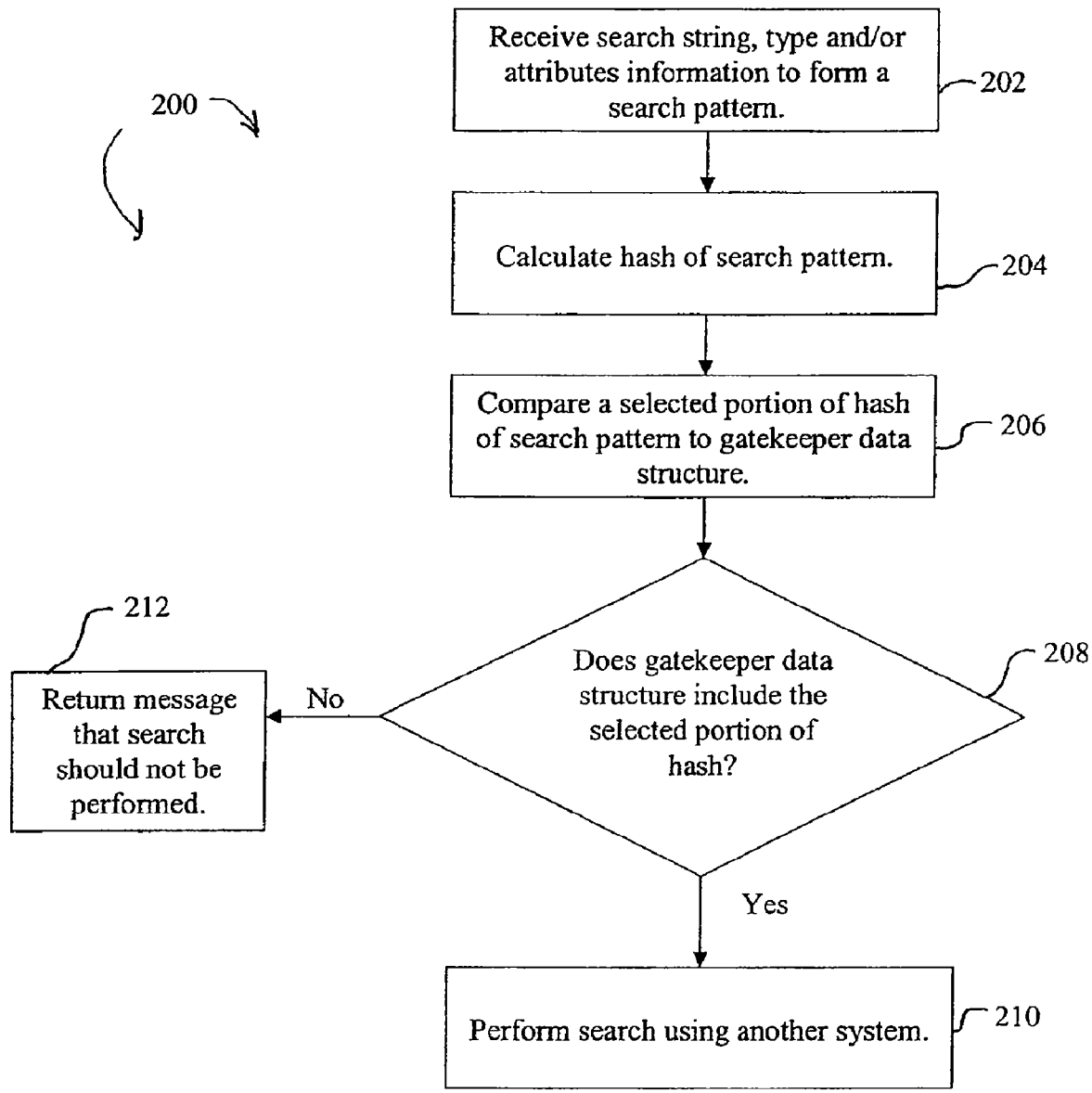
FIG. 2 illustrates a method of using the abbreviated look-up data structure.

Referring now to FIG. 2, a method 200 of performing gate keeping activities is illustrated. The examples illustrated in FIGS. 2-5, in keeping with the example of FIG. 1, are related to search operations such as those that might be performed in a search engine context or relational database context. However, it should be noted that the gate keeping operations can be applied to a number of contexts where it is desirable to know the presence of certain parameter patterns before more expensive operations are performed.

Referring to FIG. 2, FIG. 2 illustrates an act of the receiving a search string 202. Receiving a search string (202) may include for example receiving a string of text that a user wishes to find in a relational database or by using search engine algorithms and hardware. In this example, only the case is shown where a simple search is specified, e.g. the user puts "quick red fox" in quotes signifying an exact phrase search corresponding to the pattern "quick red fox -x" that may have been a pattern that could be represented as a single "1" bit in the gatekeeper data structure 102. In other instances, the search pattern may be represented by more than one bit, such as, but not limited to, the application of overlapping patterns of the search terms. For example, a three word search tuple pattern can be broken down into two separate two-word search tuple patterns.

FIG. 2 further illustrates an act of calculating a hash of the received search string (204). Calculating a hash may be performed using the same algorithm to calculate the hash used in the numerical representation field 112 illustrated in FIG. 1. For example, if a search string was received at act 202 where the search string is "quick red fox" the hash calculated would be 1c1539fdf2306635, the same hash calculated when creating the gatekeeper data structure 102 of FIG. 1.

FIG. 2 further illustrates an act of comparing a selected portion of a calculated hash of a search string to a gatekeeper data structure (act 206). Illustratively, in the present example, a 32 bit gatekeeper data structure 102 is being used. Thus, because the last five binary bits of the hash number were used to set bits in the gatekeeper data structure 102 representing parameter patterns for the search data base, the last five binary bits of the calculated hash of the received search string will be used to reference the gatekeeper data structure 102. The last eight bits of the calculated hash can be determined from the last two hexadecimal numbers of the calculated hash. Thus, the last two hexadecimal numbers of the hash for "quick red fox" is 35. 35 in hexadecimal corresponds to 00110101 in binary. By truncating the first three most significant bits, the last five least significant bits are 10101. This corresponds to a hexadecimal number 15.

Referring now to FIG. 1, the gatekeeper data structure 102 illustrates that the binary bit in the value field 106 corresponding to the hexadecimal number 15 being set. Thus, there is a likelihood that the string "quick red fox" appears in a set of parameters to which the gatekeeper data structure 102 corresponds. In this particular example, the likelihood that "quick read fox" appears in the set of parameters to which the gatekeeper data structure 102 corresponds is roughly 50%. As described previously, if the gatekeeper data structure 102 were 64 bits, then the likelihood would be increased to roughly 75%. Additionally, as described previously, additional increases in the size of the gatekeeper data structure 102 increases the likelihood that a particular string will appear in the set of parameters corresponding to the gatekeeper data structure 102.

Referring once again to FIG. 2, FIG. 2 illustrates that a decision is made to determine if the gatekeeper data structure includes the selected portion of the hash (act 208). As alluded to above, the selected portion of a hash in this particular example includes the last five binary digits of the hash. In this example, "include" means that the bit of the gatekeeper data structure corresponding to the last five binary digits is set. As described previously, the bit at hexadecimal 15 is set indicating that there is a probability that the string, or pattern, "quick red fox" appears in the set of parameters corresponding to the gatekeeper data structure 102. Notably, while in this example, the last five binary digits of the hash are used, it should be noted that other portions of the hash may be used. The only requirement in the particular embodiment illustrated is that the same portion of the search string hash be selected as the selected portion of the hash Onz X for the parameter patterns used for setting bits in the gatekeeper data structure 102.

Because there is a possibility that the phrase "quick red fox" appears in the set of parameters corresponding to the gate keeper data structure, the more expensive search operations may be performed (act 210) on the set of parameters corresponding to the gatekeeper data structure 102, in the respective data cluster. Thus, an expensive search operation that may cost for example $1/10$ of a second will not be performed based on a check of the gatekeeper data structure 102 which can be performed in times on the order of 1/1,000,000 of a second.

Alternatively consider the example when the search string is "quick red frog." In this example, the hash calculated at act 204 may be 09c3aacb09347f2c. The last two hexadecimal numbers are 2c. This corresponds to a binary number of 00101100. The last five binary digits of this number are 01100 which correspond to the hexadecimal number c. As illustrated in FIG. 1, the element in the value field corresponding to the hexadecimal number c is not set. As such, it is known with 100% accuracy that "quick red frog." is not included in the set of parameters corresponding to the gatekeeper data structure 102. As such, a message indicating that a search should not be performed can be returned (act 212) indicating that a different search should be attempted. This result, if applied individually to each cluster, can also be used to identify which clusters not to search, until one of the clusters provides a result indicating that a search should be performed.

Figure 3:
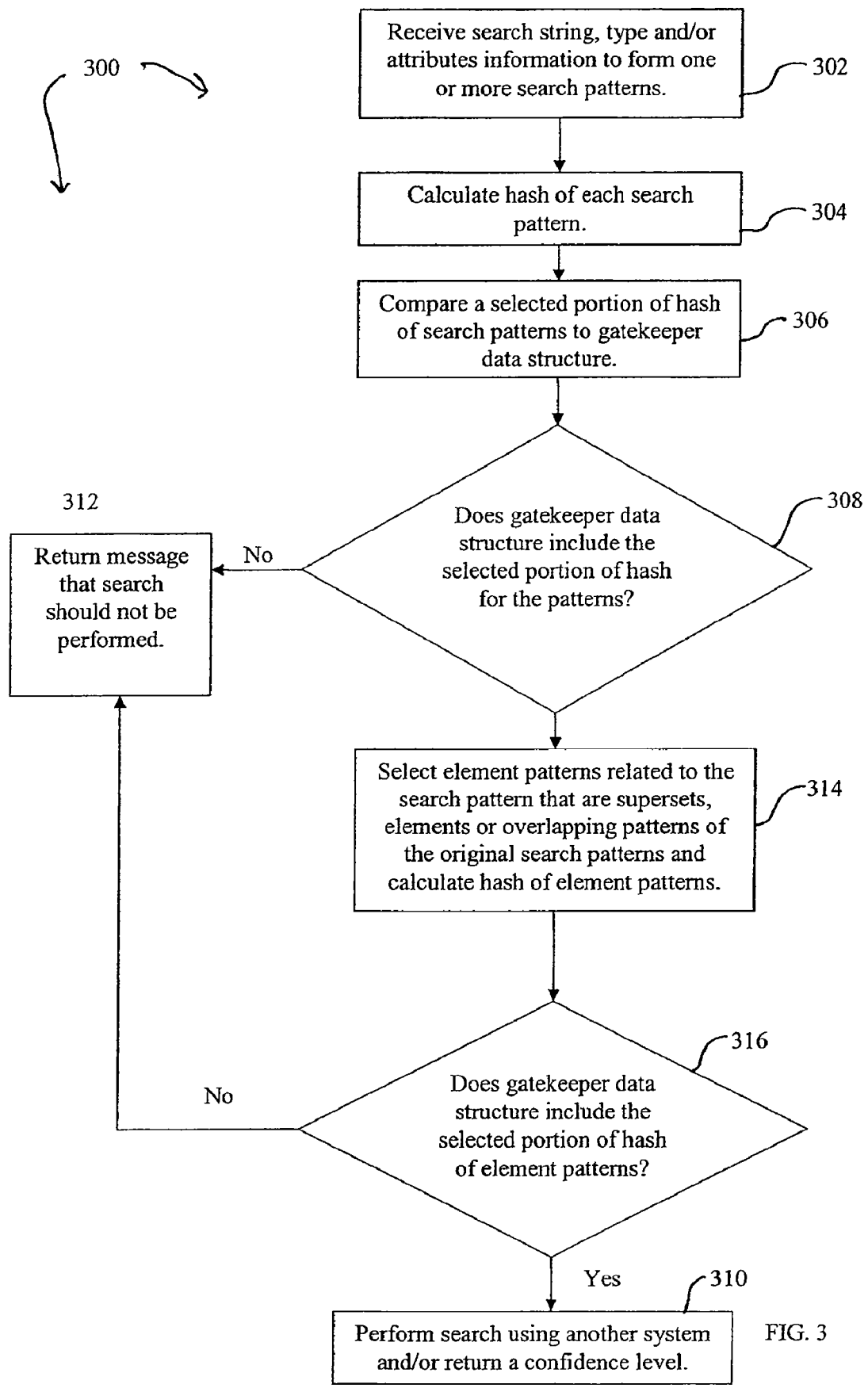
FIG. 3 illustrates another method of using the abbreviated look-up data structure.

Referring now to FIG. 3, another embodiment is illustrated that is similar to the example of FIG. 2. For example the acts 302, 304, 306, 308, 310, and 312 may be performed in a fashion similar (however, note that the corresponding acts in FIG. 3 are directed to examples where one or more search patterns are received) to corresponding acts 202, 204, 206, 208, 210 and 212 respectively in FIG. 2.

FIG. 3 illustrates additional acts that may be performed to increase confidence and to further detect when a search may not yield fruitful results thereby avoiding performing the costly search. For example, at 308, a determination is made whether or not the gatekeeper data structure 102 includes a selected portion of a hash in a fashion similar to act 208 in FIG. 2. However, once it is determined, that the hash of a search string includes the selected portion (i.e. the last 5 bits) that corresponds to a set bit in the gatekeeper data structure 102, further calculations can be performed on elements patterns of the search string. For example, the search string "quick red fox" can be divided into several other elements of the search string such as "quick," "red," "fox," "quick red," "quick fox," and "red fox." As noted at 314 in FIG. 3, these element patterns may be, for example and not limited to, supersets, elements, or overlapping sets, as will be described in more detail below, of the original search patterns.

A hash may be calculated for one or more of these element patterns of the search string. For each element pattern for which a hash is calculated where a portion is included in the gatekeeper data structure, the confidence that the full search string is included in the set of parameters corresponding to the gatekeeper data structure 102 is increased. As is described in more detail below, additional overlapping patterns such as "quick red red" or other patterns can be checked in the gatekeeper data structure when provided for when parameter patterns are indexed.

Illustratively, the hash value for "fox" is 40b8636cf497235c which has a last five binary digits of 11100 which is 1c in hexadecimal. The hash value for "red" is 100519ba81728d8 which has a last five binary digits of 11000 which is 18 in hexadecimal. The hash value for "red fox" is f9d6824a13b3ed25 which has a last five binary digits of 00101 which is 5 in hexadecimal. The hash value for "quick" is b249f6d0e2e948fc which has a last five binary digits of 11100 which is 1c in hexadecimal. The hash value for "quick fox" is ec45e8c4c06bed36 which has a last five binary digits of 10110 which is 16 in hexadecimal. The hash value for "quick red" is b0cc990de2fd626d which has a last five binary digits of 01101 which is d in hexadecimal. Each of bits in the value field 106 corresponding to the index entries 1c, 18, 5, 16, and d are set (i.e. "1"). Each element of the search string known to have a corresponding entry in the gatekeeper data structure increase the confidence that the entire search string "quick red fox" appears in the set of parameters.

Illustratively, if the gatekeeper data structure 102 is checked for portions of a hash for one of "quick," "red," "fox," "quick red," "quick fox," and "red fox," confidence can be increased to roughly 75%. If the gatekeeper data structure 102 is checked for portions of a hash for two of the elements, confidence is roughly 87.5%, for three of the elements roughly 93.75, for four of the elements roughly 96.9, for five of the elements roughly 98.4% and for all six elements 99.2%. As noted, these confidence values are rough values based on not having a full knowledge of all of the elements and hash calculations. However, the general idea is that as more elements are hashed and compared with the gatekeeper data structure 102, higher confidence can be achieved.

Additionally, if any of the elements of the search string does not have an entry that is included in the gatekeeper data structure 102, it is known with 100% accuracy that the search string is not in the set of parameters corresponding to the gatekeeper data structure 102. For example, consider that a search string "quiet red fox" has a hash value of 100519ba1817285c. The last five bits of this hash value are 1110 which appears in the gatekeeper data structure 102. Thus, there is a possibility that "quiet red fox appears in the set of parameters corresponding to the gatekeeper data structure 102. Continuing now with the present example, "quiet" is an element of the search string "quiet red fox." The hash for "quiet" may be 100519ba1817282c. The last five bits of this hash value are 01100, which corresponds to the hexadecimal number c. Hexadecimal c does not appear in the gatekeeper data structure 102. As such, "quiet" does not appear in the set of parameters corresponding to the gatekeeper data structure 102 and as such "quiet red fox" does not exist in the set of parameters corresponding to the gatekeeper data structure 102. As such, as illustrated in FIGS. 3 and 316, when a selected portion of a hash of one of the elements of a data string does not appear in the gatekeeper data structure a message indicating that a search should not be performed can be returned to a user as illustrated at 312.

On the other hand if all elements of a search string that are hashed and compared with the gatekeeper data structure 102 appear in the gatekeeper data structure, then a search may be performed as illustrated at 310. 310 further illustrates that in addition to or in place of a search being performed, a confidence value that a search string exists in a full database may be returned.

The example illustrated by FIG. 3 can further be used to illustrate yet another embodiment that may be used to increase the confidence that search terms in a search string can be found using a full text search on a database. The gatekeeper data structure 102 may be expanded such that the gatekeeper data structure 102 can include an index of overlapping elements of parameter patterns that have been manipulated in a given way such that elements of parameter patterns can be indexed in the gatekeeper data structure 102 in a number of different ways. For example, when creating the gatekeeper data structure 102, a bit may be set for a selected portion of a hash for the parameter pattern "quick red fox." Additionally as described above, bits may be set using a selected portion of hashes for elements of the parameter pattern including "quick red" and "red fox." "quick red" and "red fox" are overlapping patterns of "quick red fox."

Additionally, other overlapping patterns may be indexed in the gatekeeper data structure. For example, various manipulations may be done to elements of a parameter pattern which may then be indexed in the gatekeeper data structure 102. For example, if "quick red fox" is a parameter pattern indexed in the gatekeeper data structure 102, element patterns such as "quick red," "quick red red," "quick quick red," "quick red quick red," "quick fox," "quick fox fox," "quick quick fox," "quick fox quick fox," "red fox," "red fox fox," "red red fox," and "red fox red fox" may be hashed and the appropriate selected bits of the hashes used to set corresponding bits in the gatekeeper data structure 102. Notably, the gatekeeper data structure 102 would be expanded in size to be able to accommodate the additional indexing. As mentioned above, the related patterns do not have to correspond to exact terms. For example, related patterns to the "quick red fox" could also include such things as "fast fox", "quick cat", "qu fo" or any other type of pattern.

In one embodiment, when a search string of "quick red fox" is received, not only can the selected bits of the hash of "quick red fox" be checked in the gatekeeper data structure 102, but also the selected bits of the hash of one or more of "quick red," "quick red red," "quick quick red," "quick red quick red," "quick fox," "quick fox fox," "quick quick fox," "quick fox quick fox," "red fox," "red fox fox," "red red fox," "red fox red fox", and/or other patterns, could be checked in the gatekeeper data structure 102. Each of these overlapping element patterns that is indexed in the gatekeeper data structure 102 that is checked for an entry in the gatekeeper data structure 102 at search time increases the confidence that "quick red fox" actually appears in the database. When the confidence is at a sufficiently high level, a full text search may be done on the database cluster corresponding to the gatekeeper index, such as by using a full text index and/or other indexing techniques.

Any one of a number of overlapping patterns may be used. The following are some examples, but in nowise should be construed to be the full extent of patterns that are contemplated by the embodiments of the invention. As shown above, duplicates of elements can be used, such as for example "quick red red." The pattern including the duplicate elements is then hashed and selected portions of the hash are used to set a bit in the gatekeeper data structure. At search time, a pattern including the duplicate can be checked against the gatekeeper data structure. In another example, a predefined string or number may be added to each element pattern. For example an X may be added to the element pattern such as for example "quick red X." "quick red X" may then be hashed and bits selected from the hash to set a bit in the gatekeeper data structure.

In one example, a pattern such as "quick X fox" may be hashed and bits selected from the hash used to set a bit in the gatekeeper data structure. X may represent words to be removed before a hash is created, or may be a predefined string applied to the search string before the hash is created. Respective examples are "quick fox" being hashed when the parameter pattern is "quick red fox" and "quick string red" when the parameter pattern is "quick red." This example can be extended to multiple words as well. For example, a hash may be created for "The X Y fox" where a hash is created for "The fox" when the parameter pattern is "The quick red fox." Alternatively, a hash may be created for "quick string1 string2 red" when the parameter pattern is "quick red."

In yet another example portions of words or parameter patterns may be included as being indexed in the gatekeeper data structure. For example, when a parameter pattern is "quick red fox," "qu re fo" may be hashed as an overlapping pattern that may be indexed in the gatekeeper data structure.

In another example, a logical function may be applied to elements of the pattern. For example, a numerical representation of "quick" may be logically XORed with a numerical representation of "red" to create a new numerical representation from which bits can be selected to set a bit of the gatekeeper data structure. Other logical ANDing, adding, subtracting and the like can also be performed on numerical representations of elements.

As described above, at search time, the overlapping patterns of a search string can be checked against the gatekeeper data structure 102. For every overlapping pattern that appears in the gatekeeper data structure 102, confidence is increased that the original search string appears in the database. When confidence is at a sufficiently high level, a full text search can be performed. Additionally, in one embodiment, by using gatekeeper data structures as front ends to various storage resources or computing clusters, the storage resources that are most likely to yield fruitful results can be searched while other resources not likely to yield fruitful results will not be searched.

In some embodiments, different prefiltered indexes or gatekeepers are applied to different storage resources and clusters. Different prefiltered indexes or gatekeepers can also be applied to the same storage resources and clusters, providing a way for fine tuning or improving the searching accuracy and speed by incrementally processing or applying the search pattern(s) to the various gatekeeper datastructures.

Notably, while every overlapping pattern that is indexed in the gatekeeper data structure(s) increases confidence that a search string appears in the database, even a single overlapping pattern that is not indexed in the relevant gatekeeper data structure(s) will indicate with 100% accuracy that the search string is not in the corresponding database(s). This knowledge can be leveraged to reduce the searching processes and speed up the search by applying resources to the relevant clusters or databases.

Figure 4:
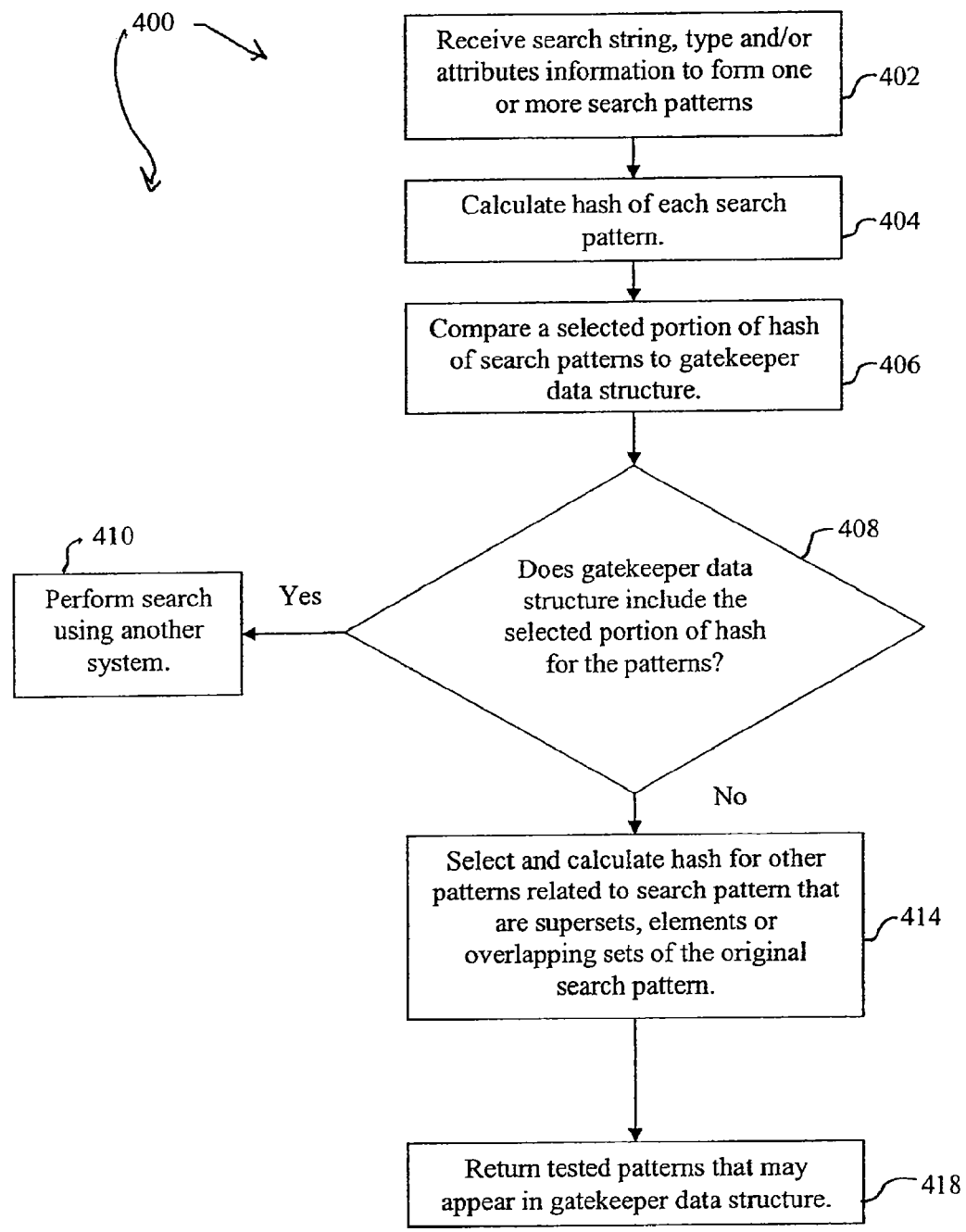
FIG. 4 illustrates yet another method of using the abbreviated look-up data structure.

Referring now to FIG. 4, another method 400 similar to those previously illustrated is shown. In the method 400, the acts labeled 402, 404, 406, 408, 410, and 414 correspond to similarly numbered acts in FIGS. 2 and 3. However, the method of FIG. 4 provides functionality for returning to a user suggested search terms rather than just returning a message indicating that a search should not be performed when a search string is not found as being indexed in the gatekeeper data structure 102. For example, at 408 if a search string such as "quick red fox" results in a hash that includes a corresponding entry in the gatekeeper data structure, then a search for "quick red fox" will be performed as is illustrated at act 410. However, if the search phrase "quick red frog" is searched the hash calculated at act 404 may be 09c3aacb09347f2c. The last two hexadecimal numbers are 2c. This corresponds to a binary number of 00101100. The last five binary digits of this number are 01100 which correspond to the hexadecimal number c. As illustrated in FIG. 1, the element in the value field 106 corresponding to the hexadecimal number c is not set. As such, it is known with 100% accuracy that "quick red frog." is not included in the set of parameters corresponding to the gatekeeper data structure 102. Rather than simply returning a message that a search should not be performed as shown at 212 in FIG. 2, at act 414 hashes may be calculated for elements of the search string "quick red frog." For example, hashes can be calculated for "quick," "red," "frog," "quick red," "quick frog," and "red frog." As described previously, hashes for "quick," "red," and "quick red" will all result in corresponding set entries in the value field 106 of the gatekeeper data structure 102. As such, "quick," "red," and "quick red" may be returned to the user as suggested search terms that may appear in the gatekeeper data structure 102 (418). This allows the user to adjust a search string to try and find a string that is searchable in the set of parameters corresponding to the gatekeeper data structure 102.

Other embodiments may be implemented as well such as some embodiments that use combinations of elements disclosed in the methods of FIGS. 2, 3, and 4. For example, in one embodiment, combinations of elements of search strings may be compared to the gatekeeper data structure 102 to further increase the likelihood that a search will yield fruitful results until one of the elements of the search string are not found in the gatekeeper data structure. At that point, successful combinations of elements can be returned to a user, as well as unsuccessful combinations of elements of the search string.

As described previously, this example is a simple example that includes a limited number of parameter patterns, in this example 15. Even with this example however, it can be seen that using a 32 bit memory location, searches of the full set of parameters, or even an index of the full set of parameters can be avoided when the search would be fruitless. In particular, this example shows the utility of creating 16 patterns to represent a four word string of words. In particular, One can determine that "quick red fox" is in a set of parameters such as a database to a certain tolerance before we call for a very expensive full text search of the database or that "fox red" is with 100% accuracy not in the set of parameters. The cost of the 15 patterns is only four bytes (32 bits) for a 2× version and only eight bytes for a 4× version, and only 32 bytes for a 16× version at two bytes per pattern. The 16× version is accurate to over 94% on a single test of a pattern. Meanwhile, if the patterns themselves were stored, just one of the patterns would take up typically at least 12 to 20 bytes or a probable minimum of 96 bits each.

This example shows a limited vocabulary of four words and a total of 15 parameter patterns. However, it should be appreciated that other examples may scale to much larger sizes. For example, a full pattern index may include an abbreviated portion as a front end: As such, in one example, a 100M abbreviated pattern index gatekeeper data structure can pre-filter a full pattern index that may require 3 Gbytes of disk space.

Assume that a web search engine has indexed 16 billion web pages at about 1,000 words per page stored on 200,000 machines with partitions of 10 million documents per partition, or 1,600 partitions using 1,600 clusters of servers. That is 16 trillion words. Taking each four words, moving along one word at a time, to create 12 patterns (this can be done by excluding individual words) would result in 480 trillion patterns. A 2× version data structure therefore has only 960 trillion bits.

Translated to bytes that is 120 trillion bytes. Using systems that have 256 G of RAM, the gatekeeper data structure can be stored in 480 of those machines. For a 4× system, 960 machines are used. Proximity patterns could be searched using gatekeeper programs and data structures on these 480 machines to a very detailed level even with the setting at only 2× for the gatekeeper data structure.

Only after the gatekeeper machines gave a positive response would a full search be made on the 1,600 clusters. And even then, specific clusters or machines would be selected based on queries to gatekeeper data structures first. In one embodiment, each gatekeeper machine of the 480 described above could correspond to four clusters of machines, instead of the full 1,600 clusters. To further increase speed, in one embodiment each machine would not be partitioned along 10M document lines (1,600 total clusters) but rather have 100 100K documents (160,000 total clusters) on the same machine. This will allow the patterns to have even better resolution, as well as making the final search that much faster using existing search methods.

Another embodiment will now be illustrated for a database context. The particular database context uses a Personal Ancestral File (PAF) record. PAF is family history database title available from www.familysearch.org. The following is a set of patterns created for the record of Jonathan Taylor Packer. The full record information of Jonathan Taylor Packer is as follows:

I6;LFM#6;Packer;Jonathan Taylor;;M;F758;26 JUL 1817; Perry Twp,Richland, Ohio;29 JAN 1889;Safford,Graham, Arizona;

The patterns include combination of information including surname, given name, birth year, death year, and location.

| Pattern Number | PAF Record Number | Parameters Pattern | Calculated Hash |
|---|---|---|---|
| 236 | 6 | /Packer/_Jonathan | 40b8636cf497235c |
| 237 | 6 | /Packer/_Jonathan_1817 | 100519ba181728d8 |
| 238 | 6 | /Packer/_Jonathan_1817-Birth | f9d6824a13b3ed25 |
| 239 | 6 | /Packer/_Jonathan_1810's | b249f6d0e2e948fc |
| 240 | 6 | /Packer/_Jonathan_1810's-Birth | ec45e8c4c06bed36 |
| 241 | 6 | /Packer/_Jonathan_1815's | b0cc990de2fd626d |
| 242 | 6 | /Packer/_Jonathan_1815's-Birth | 1c1539fdf2306635 |
| 243 | 6 | /Packer/_Jonathan_P1:OH | 1a6a89be20908b63 |
| 244 | 6 | /Packer/_Jonathan_P1:OH-Birth | 679e70ee245a112d |
| 245 | 6 | /Packer/_Jonathan_1889 | 0ffc1785181760df |
| 246 | 6 | /Packer/_Jonathan_1889-Death | 56cf1314b42ff1d1 |
| 247 | 6 | /Packer/_Jonathan_1880's | 00bf1348c0e06f58 |
| 248 | 6 | /Packer/_Jonathan_1880's-Death | 272dc1de87ccca95 |
| 249 | 6 | /Packer/_Jonathan_1885's | fe417685c0f445c9 |
| 250 | 6 | /Packer/_Jonathan_1885's-Death | e6305123b5974196 |
| 251 | 6 | /Packer/_Jonathan_P1:AZ | 1a64885620908c7e |
| 252 | 6 | /Packer/_Jonathan_P1:AZ-Death | 672e7ebcfe0bef51 |
| 253 | 6 | /Packer/_Taylor | 575af49f4514ff73 |
| 254 | 6 | /Packer/_Taylor_1817 | a36b5b11d1b2f31b |
| 255 | 6 | /Packer/_Taylor_1817-Birth | 06b7db11aea863d8 |
| 256 | 6 | /Packer/_Taylor_1810's | cfa3b31b048ff5ce |
| 257 | 6 | /Packer/_Taylor_1810's-Birth | 7ce480e21a228099 |
| 258 | 6 | /Packer/_Taylor_1815's | ce2855d6049bdf5f |
| 259 | 6 | /Packer/_Taylor_1815's-Birth | cd07921f28790b9a |
| 260 | 6 | /Packer/_Taylor_P1:OH | 61394fbf22ec0a58 |
| 261 | 6 | /Packer/_Taylor_P1:OH-Birth | b1233f210325908f |
| 262 | 6 | /Packer/_Taylor_1889 | a3745d4ad1b2bb1c |
| 263 | 6 | /Packer/_Taylor_1889-Death | 09c3aacb09347f2c |
| 264 | 6 | /Packer/_Taylor_1880's | 0a504da32686d26a |
| 265 | 6 | /Packer/_Taylor_1880's-Death | 21e529c05d85a73a |
| 266 | 6 | /Packer/_Taylor_1885's | 07d4b15e2692f8fb |
| 267 | 6 | /Packer/_Taylor_1885's-Death | 2303f9016fde2c39 |
| 268 | 6 | /Packer/_Taylor_P1:AZ | 61374f5322ec0d45 |
| 269 | 6 | /Packer/_Taylor_P1:AZ-Death | 3c667257d9746ef3 |
| 270 | 6 | /Packer/_Jonathan_Taylor | d5d54b9b0625dfce |
| 271 | 6 | /Packer/_Jonathan_Taylor_1817 | 8f5a7f1316709957 |
| 272 | 6 | /Packer/_Jonathan_Taylor_1817-Birth | db21ad3795eff277 |
| 273 | 6 | /Packer/_Jonathan_Taylor_1810's | 71e42eb19b798f79 |
| 274 | 6 | /Packer/_Jonathan_Taylor_1810's-Birth | ac3cbb8a25d178bd |
| 275 | 6 | /Packer/_Jonathan_Taylor_1815's | 59e347ec9b6da0fc |
| 276 | 6 | /Packer/_Jonathan_Taylor_1815's-Birth | 53af475343414d77 |
| 277 | 6 | /Packer/_Jonathan_Taylor_P1:OH | bdd5eb0ae64a812c |
| 278 | 6 | /Packer/_Jonathan_Taylor_P1:OH-Birth | 8e3172f8840751ac |
| 279 | 6 | /Packer/_Jonathan_Taylor_1889 | 8f63814c16709dd1 |
| 280 | 6 | /Packer/_Jonathan_Taylor_1889-Death | 0989782686a60eb2 |
| 281 | 6 | /Packer/_Jonathan_Taylor_1880's | 2da59505897b1540 |
| 282 | 6 | /Packer/_Jonathan_Taylor_1880's-Death | e300a42740cad3f9 |
| 283 | 6 | /Packer/_Jonathan_Taylor_1885's | 159cac48896f3ac5 |

-continued

| Pattern Number | PAF Record Number | Parameters Pattern | Calculated Hash |
|---|---|---|---|
| 284 | 6 | /Packer/_Jonathan__Taylor__1885's-Death | 5e87345e265ae633 |
| 285 | 6 | /Packer/_Jonathan__Taylor__P1:AZ | bdc7e7aae64af130 |
| 286 | 6 | /Packer/_Jonathan__Taylor__P1:AZ-Death | 56cb74d2f7466809 |

The first column includes a count of patterns created for this pass through the database. The #6 in the second column is for the record #6 of the PAF file that patterns are being created for to be indexed in the gatekeeper data structure. The number in the last column is a hexadecimal number (64 bit) of a good hash code of the string of each pattern. For 1,001 records 29,994 patterns were created around the surname, given names, birth year and death year. Note that overlapping patterns have been included. For example, 1800's includes the years 1800 through 1899. 1885's includes the years 1885 to 1894. These overlapping patterns can be used to double check a search and also tune in on correct searches when an incorrect search string is If 16 bits of the hexadecimal hash are allocated for use with a gatekeeper data structure hash array, a 2× pattern could be accomplished. The gatekeeper data structure in this example has 64 k bits. The last four hexadecimal digits of each of the 29,994 patterns may be used to set the corresponding bit in the gatekeeper data structure. For example, for Jonathan_Packer a hash of 0x40b8636cf497235c is created. The low 16 bits is hexadecimal 235c. This bit is then set in the 64 k bit gatekeeper data structure array. This process is continued for the other 29,994 patterns. On average, for a 2× hash table, half of the bits will be set and spread out somewhat evenly throughout the array because this is pretty good hash routine.

A retrieval string this then received from a user. For example, a retrieval string may be "Jonathan Packer 1882" with no specific event given. The following patterns may be created: /Packer/_Jonathan, /Packer/_Jonathan__1882, /Packer/_Jonathan__1880's and /Packer/_Jonathan__1875's. We would check the most specific pattern /Packer/_Jonathan__1882 by computing a hash, taking the last 4 hexadecimal digits as the bit number to access the 2× abbreviated pattern index array (64 k possibilities). For this example, a false is returned, because the hash corresponding to /Packer/_Jonathan__1882 does not appear in the gatekeeper data structure. A false is definite, meaning that the retrieval does not correspond to a record in the database. I.e., there is no Jonathan Packer that has an event in 1882. Other possibilities could then automatically be searched. For example, the most general pattern /Packer/_Jonathan, could be checked. This pattern has a hash of 0x40b8636cf497235c. Using hexadecimal 235c as the bit address a true flag is found in the gatekeeper data structure at this address. Thus, the database may include a record with /Packer/_Jonathan. In particular, there is roughly a 50% chance that the database includes a record with /Packer/_Jonathan. A more specific pattern could then be checked, such as for example, /Packer/_Jonathan 1880's. This pattern also has a hash that results in a set bit in the gatekeeper data structure. However, the pattern /Packer/_Jonathan__1875's results in a false, i.e. a corresponding bit not being set in the gatekeeper data structure. The pattern /Packer/_Jonathan__1885's results in a true, i.e. a corresponding bit being set in the gatekeeper data structure. At this point, there are three trues. There is a 75% probability for the second true, and 87.5% possibility of /Packer/_Jonathan 1885 to 1889. Five patterns for the years in between 1885 to 1889 could be checked which will result in a true for /Packer/_Jonathan__1886 and /Packer/_Jonathan__1889. 1886 is a false lead but at this point, from a very tiny 2× hash array, the abbreviated patterns have been used to get about a 87.5% chance that either /Packer/_Jonathan__1886 or /Packer/_Jonathan__1889 really exists in the file. Using birth and death patterns, further confidence increases can be obtained by testing a few additional bits. Confidence can be increased to the 99% range or better. From a bad retrieval query, the possible true values have been found by searching around the pattern space with interlocking patterns. A similar kind of exercise could be done with geographical or other data as well.

In this manner, a very imprecise pattern can be leveraged to provide a much higher confidence level on a search from a gatekeeper data structure representing a very small abbreviated pattern index in memory hash array.

Contrasted with this is a full pattern in the full pattern index. A full pattern in the full pattern index would take not just two bits to represent but many bytes, perhaps an average of 10 or more. That equates 80 bits. Additionally, a compression and decompression process will be involved in getting to it and it will likely be in a large ordered disk file.

As noted in examples shown previously herein, overlapping patterns may be used to tune in on search terms and to increase confidence that a search string may be found within a database. For example, the following semantic and superset/subset relationships among patterns used for evaluating truth and confidence levels on retrieval may be used for the database example illustrated above:

1. /Packer/_Jonathan→child 2.7
1.1. /Packer/_Jonathan__1810's→child 1.2.1. (overlapping sibling with 1.2)
1.1.1. /Packer/_Jonathan__1810's-Birth→child 1.2.2.1.
1.2 /Packer/_Jonathan__1815's (overlapping sibling with 1.1)
1.2.1. /Packer/_Jonathan__1817→child 1.2.2.1. (no overlap with 1.2.2)
1.2.2. /Packer/_Jonathan__1815's-Birth (no overlap with 1.2.1)
1.2.2.1 Packer/_Jonathan__1817-Birth
1.3. /Packer/_Jonathan__1880's→child 1.4.1 (overlapping sibling with 1.4)
1.3.1 Packer/_Jonathan__1880's-Death→child 1.4.1.1.
1.4. /Packer/_Jonathan__1885's (overlapping sibling with 1.3)
1.4.1 /Packer/_Jonathan__1889→1.4.2.1. (no overlap with 1.4.2)
1.4.2. /Packer/_Jonathan__1885's-Death (no overlap with 1.4.1)
1.4.2.1 /Packer/_Jonathan__1889-Death
1.5. Packer/_Jonathan_Pl:OH
1.5.1. Packer/_Jonathan_Pl:OH-Birth
1.6. Packer/_Jonathan_Pl:AZ
1.6.1. /Packer/_Jonathan_Pl:AZ-Death
2. /Packer/_Taylor
. . .
2.7. /Packer/_Jonathan_Taylor (no overlap with siblings)

Illustratively, if child is true (i.e. has a numerical representation that appears in the gatekeeper data structure), a check is made for the numerical representation of the parent(s) which must also be true. The confidence factor will increase with the validity of the true statement. By following siblings, other true conditions may be discovered. However, a single false can make all of the others false as well. For example, /Packer/

_Jonathan_1885's-Death==false→/Packer/_Jonathan_ 1889-Death must be false as well, even if it is listed as true in the gatekeeper data structure.

The following illustrates another full text retrieval pattern. This example uses the first verse of the Bible as an example. "In the beginning God created the heaven and the earth." (Genesis 1:1)

Various patterns can be created. For example as illustrated below, patterns for exact phrases using two, three, and four tuples can be created. The following are examples of tuples. In these tuples, ordering and proximity are not necessarily maintained.
1. "in the beginning God"
2. "the beginning God created"
3. "God created the heaven"
4. "created the heaven and"
5. "the heaven and the"
6. "heaven and the earth"
7. "in the beginning"
8. "the beginning God"
9. "beginning God created"
10. "God created the"
11. "created the heaven"
12. "the heaven and"
13. "heaven and the"
14. "and the earth"
15. "in the"
16. "the beginning"
17. "beginning God"
18. "God created"
19. "created the"
20. "the heaven"
21. "heaven and"
22. "and the"
23. "the earth"

The following are examples of ordered phrases without function words using 2, 3, and 4 tuples. In other words, the ordering of words appears as they do in the quoted verse. Additionally, function words such as the, and, and in have not been used.
1. "beginning God created heaven"
2. "God created heaven earth"
3. "beginning God created"
4. "God created heaven"
5. "created heaven earth"
6. "beginning God"
7. "God created"
8. "created heaven"
9. "heaven earth"

The following are near patterns in a window of four content words, using 2 and 3 tuples.
1. "beginning God heaven"
2. "beginning created heaven"
3. "beginning created"
4. "beginning heaven"
5. "God created earth"
6. "God heaven earth"
7. "God earth"
8. "God heaven"
9. "created earth"

One way to test out other orders of the words is to create patterns that are alphabetically ordered or some other consistent ordering, or simply to try out the various possible orders at run time. The following is an example from the ordered content word patterns.
1. "beginning created God heaven"
2. "created earth heaven God"
3. "beginning created God"
4. "created God heaven"
5. "created earth heaven"
6. "beginning God"
7. "created God"
8. "created heaven"
9. "earth heaven"

For these 10 words "In the beginning God created the heaven and the earth," 23+9+9+9 patterns for a total of 51 patterns are created. Other embodiments may include even more additional patterns. Interlocking patterns are being created that can check each other to increase the predictive power of even a 2× system. These 51 patterns are going to be represented in only 16 bytes as one or more gatekeeper data structures totaling 128 bits, not 80 to 100 bytes per pattern, or 612 to 1020 total bytes or 4896 to 8160 bits.

It is possible to partition the different patterns as different arrays in a gatekeeper data structure so that for example ordered patterns, content only patterns, unordered patterns, root forms patterns, relevance related patterns, MIT level of confidence patterns, highly referenced patterns, exact phrase patterns, near patterns, near and in order patterns, etc. can be distinguished from one another. As explained previously different arrays in the gatekeeper data structure may be used for different patterns.

Alternatively, more than one bit may be used, say two bits or a 4 bit nibble. Alternatively, a separate attribute array with 1 or more attribute patterns associated with a single pattern may be used.

The following now illustrates an example query applied to the gatekeeper data structure. The example query may be "God created earth." For a 2× array, the exact phrase array (64 bits to contain 23 patterns) may be checked for the whole query. This results in a false, i.e. an indication that the exact phrase "God created earth" does not appear in the verse "In the beginning God created the heaven and the earth." Elements of the search string may be checked. For example, a parameter pattern of "God created" yields a true, whereas a parameter pattern of "created earth" yields a false. Using the content word array of 9 patterns in 32 bits a false is returned on "created earth." Using the near content word array of 9 patterns in 32 bits a true is returned on "created earth." This multiple array approach is an efficient method, only costing a total of 128 bits for the gatekeeper data structure.

Another approach is to put all of the patterns into the same array and have an attribute associated with the pattern name itself. For example, a pattern such as "God created heaven" may have an attached attribute of "OrderedContent." If two bits are used for each pattern of parameters, one of three attributes can be attached to a search string. For example, three attributes may be "ExactPhrase," "OrderedPhrase," and "OrderedNear." The attribute "ExactPhrase" means that the search string is an exact phrase that appears in the database. The attribute "OrderedPhrase" means that the exact words appear in the database in the exact order of the search string. The attribute "OrderedNear" means that the exact words appear in the exact order of the search string but that at least two of the words in the search string have an intervening word other than the other words appearing in the search string. For example "beginning God heaven" would have a true "OrderedNear" attribute because created appears between God and heaven in the phrase in the database. But "beginning God created" would have a false "OrderedNear" attribute because there are no intervening words between "beginning" and "God" and "God" and "created." Thus, the search string "God created heaven" has a true "ExactPhrase" attribute, a true "OrderedPhrase" attribute and a false "OrderedNear"

attribute. Thus, in this example 00 may indicate that the search string does not have any true "ExactPhrase," "OrderedPhrase," nor "OrderedNear" attributes. 01 may indicate that the search string has a true "ExactPhrase" attribute. 10 may indicate that the search string has a true "OrderedPhrase" attribute. 11 may indicate that the search string has a true "OrderedNear" attribute.

Attributes may also be applied to search patters by having an attribute nibble mathematically XORed or otherwise integrated into the hash for the pattern. In one example, a hash pattern may be created by interleaving hashes for individual words or by interleaving unique identifiers for the individual words. The readers attention is directed to the section titled "Hash Calculations and Unique Vocabulary Word Identifiers" below for further information and examples. However, illustrated now is a technique for integrating attributes with a hash created by interleaving. For example, "God" may have a unique identifier equal to hexadecimal 3d. "created" may have a unique identifier equal to hexadecimal 12. "heaven" may have a unique identifier equal to hexadecimal 87. An attribute field may be represented by a hexadecimal 03 (for first bit ordered, second bit content).

Thus in this example, an interleaved hash of 3d, 12, and 87 is 0081372d is created for the string "God created heaven." The hash of 03 XORed with 0081372d is hexadecimal 0081372e.

This could be accomplished all in one array of 128 bits for the 51 patterns with an auxiliary two bits per pattern for attributes for a total of 256 bits. Using two bits, the two bits may represent four attributes, such as for example 00=exact phrase attribute, 01=content ordered attribute, 10=content near attribute, 11=content unordered attribute. In another embodiment, three bits all in one array may be used. In this embodiment, eight combinations of attributes can be represented.

Using multiple arrays, or arrays with more than one bit per pattern, relevance checking, ordering, and the like can be checked in the abbreviated pattern index arrays in the gatekeeper data structure. Thus, multiple searches of the most relevant data can be pre-filtered stage by stage until enough results are obtained to send back to the user. There is no need to generate a large number of pages of results. More results can be obtained at a later time if needed.

By using attributes one can allow for many kinds of tuples and to mix both content and attribute data in the tuples. Examples of attributes may include attributes defining tuple type: such as exact phrase, content phrase, content near, content unordered, etc; multiple text entries; and other attributes such as birth year, death year, labeling fields, proper name, part of speech (i.e. verb, noun, adjective, etc), MIT quality, scholarly much referenced peer-reviewed paper etc. In a text hash, attributes can contribute to the hash number.

In a word number hash using nibbles, then the type and attributes may be "added" in at the end using any appropriate math function such as XOR, shift and XOR, MUL, combination thereof or other appropriate function.

If some of the attributes, such as "MIT quality" are stored in extra bits in an access array or a parallel array, then if there is a collision in loading it, the more specific attributes may be marked. For example, if "Phoenix, Ariz." having a confidence level #2 and a "MIT" having a confidence level #7, collide at a 3 bit per element array, the higher one is kept, in this example, the MIT level.

The patterns will intersect on some information to deal with molecules and not just atomic units. But the attributes will vary as to which are supersets, which are subsets, and which are brother/sister relationships. For example, the "born 1988" is a subset of "any event 1988." "born 1990" and "born 1991" are brother/sister patterns that do not overlap semantically.

Set/subset patterns may used to increase the confidence of the search. If a test for "Jonathan Packer died 1889" is performed and it is set, then checking "Jonathan Packer any event 1889" must also be set for a real true to exist and "Jonathan Packer any event 1880's" also must exist. After three trues, then we have a much greater confidence in the result.

For brother/sister relationships, when there is a more general true result, working down the tree going to more specific results can be accomplished. After getting a false for "Jonathan Packer died 1888," a check on Jonathan Packer died 1880's" (true) can be performed and a check on "Jonathan Packer died 1885-1895" (true) and a check back on brother/sister relationship patterns that are more specific such as for example "Jonathan Packer died 1885" and "Jonathan Packer died 1889."

Hash Calculations and Unique Vocabulary Word Identifiers

As described in the preceding examples, a hash may be calculated for parameter patterns and for search strings and elements of search strings. Notably, typical good hash calculations require a significant number of operations to create the hash number. Thus, simplified methods of arriving at a hash may be desirable.

Figure 5:
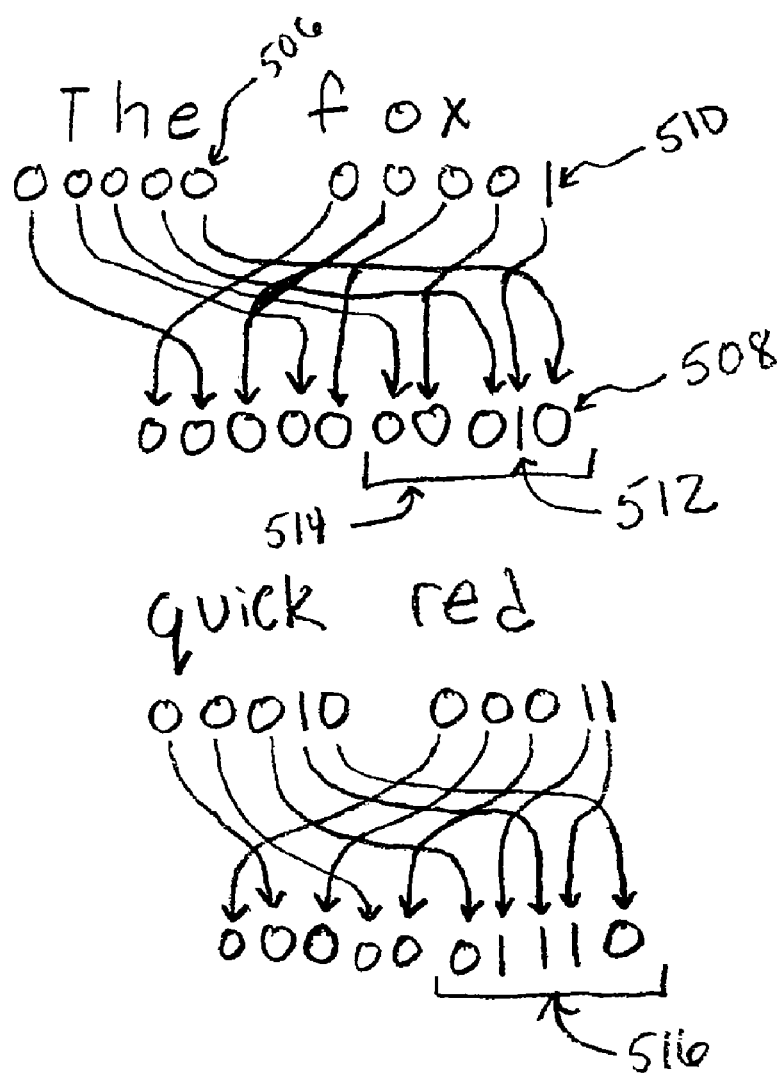
FIG. 5 illustrates a numerical representation formation process.

Referring now to FIG. 5, a simplified method is illustrated. In this example, a database includes a phrase "The quick red fox" and has a vocabulary of four words, namely, "The," "fox," "quick," and "red." FIG. 5 illustrates that each of the words 502 is assigned a unique identifier 504. In this example, the identifier 504 is a five bit binary number. The identifiers 504 for the words 502 can be used to create identifiers for combinations of the words. For example, the identifiers 504 for "The" and "fox" can be used to create the identifier 504 for "The fox." In this example the identifiers 504 are interleaved by interleaving individual bits. For example, the least significant bit 506 of "The" becomes the least significant bit 508 for the identifier 514 for "The fox." The least significant bit 510 for the identifier 504 for "fox" becomes the second least significant bit 512 for the identifier 514 for "The fox." This process is continued with the remaining bits, or with a sufficient number of bits to create an appropriately sized identifier. For this example, only a total of five bits need to be interleaved from the combination of identifiers 504 from "The" and "fox" to create the identifier 514 for "The fox." For illustrative purposes, FIG. 5 also illustrates creating an identifier 516 for "quick red."

Notably, when the identifiers for "The" and "fox" are combined they result in an identifier 514 of 00010 which is exactly the same as the identifier 504 for "quick." As such, it is noted that there are occasional collisions between identifiers. However, this explains one reason why the gatekeeper data structure 102 only identifies probabilities and not certainties that a parameter pattern will appear in a set of parameters corresponding to the gatekeeper data structure. In the particular example shown in FIG. 5, identifiers could be used that resulted in a certainty that a search string would appear in the set of parameters, however there would need to be adjustment to the fashion in which the identifiers were assigned.

For example, FIG. 6 illustrates an example where the vocabulary is restricted to the four words 602 "The," "fox," "quick," and "red." Thus, unique identifiers can be assigned to each of the four words beginning at a binary number 00100, i.e. 4 in decimal. This prevents collisions from occurring as the combination of identifiers from any two vocabulary words will be greater than identifiers for the vocabulary words themselves. By interleaving the identifiers 604 in a fashion similar to that shown in FIG. 5, unique identifiers can be created as shown in table 606. In the Example shown in FIG. 6, if the six least significant bits 608 are used, unique identifiers can be created for each of 15 parameter patterns. This would result in a gatekeeper data structure of 64 binary bits. However, one can determine with absolute certainty that a particular search string was present in a set of parameters corresponding to the gatekeeper data structure.

Figure 7:
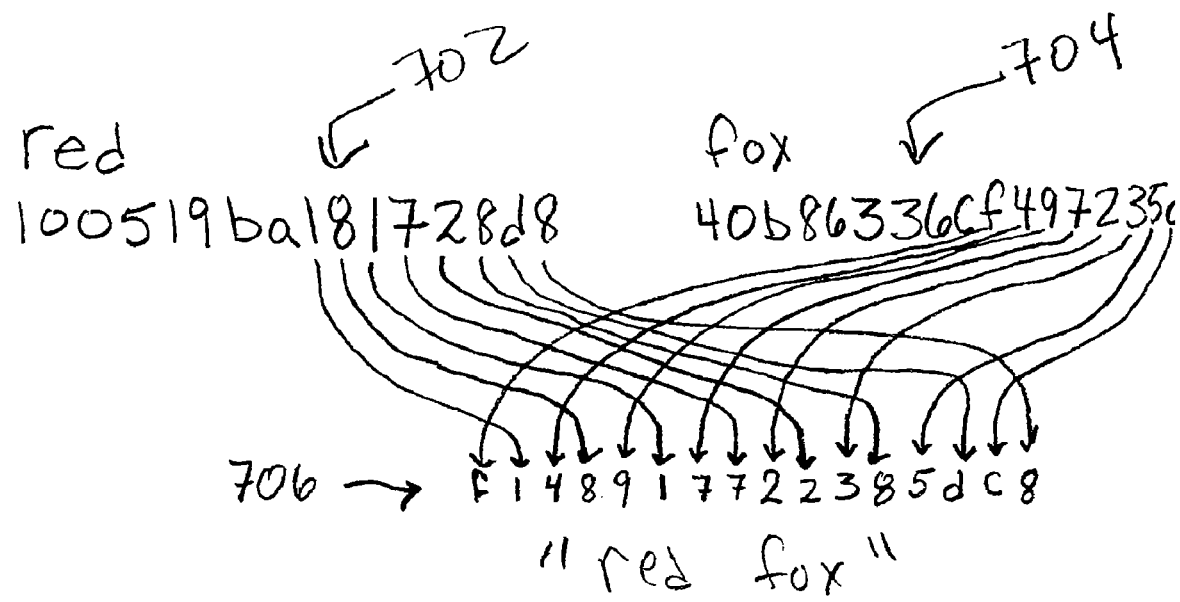
FIG. 7 illustrates yet another numerical representation formation process.

While the examples shown in FIG. 5 and FIG. 6 illustrate an interleaving process that interleaves binary bits together, it should be understood that other embodiments may interleave or otherwise manipulate other representations. For example, FIG. 7 illustrates a 64 bit hexadecimal numerical representation 702 of "red" and a 64 bit hexadecimal numerical representation 704 of "fox." A 64 bit hexadecimal representation 706 of "red fox" may be obtained by interleaving nibbles, i.e. four bit groupings, by interleaving hexadecimal numbers. Other manipulations may also be performed such as by interleaving bytes, words, or other data representations. Additionally other operations than interleaving may be used to create the numerical representations from existing numerical representations.

Using the hash methods described herein, order independent versions can also be performed. Assume that a two byte order independent pattern is being hashed. The word numbers may be looked up. The numbers are then sorted into descending (or ascending) order. The hash is then created. For example, the patterns may be "brown red" and "red brown." "red" has a hexadecimal representation of 5. "brown" has a hexadecimal representation of 46a. In either pattern ordering, the created hash is 00456ba. In this case the ordered pattern and the unordered pattern, both derived from the word numbers, can be made in the same call.

Additionally, the hashes may be able to be represented in a trie structure as opposed to a hash table. A trie structure may allow for faster look-up speeds. Hashes may be stored at the end of each trie path. The types and attributes can all predone and ready to combine quickly, bit by bit, nibble by nibble or in some other mathematical way.

Note that while the examples above have illustrated identifiers that use hash calculations, other identifiers may also be used. In other words, the embodiments are not limited only to identifiers calculated using a hash calculation.

While the examples illustrated herein have been directed to database type textual searching, it should be understood that the embodiments may be used with many other types of systems. For example, other pattern type databases such as databases with patterns for fingerprints, facial recognition, DNA patterns and the like may use principles of the embodiments described herein. Further, other computing tasks may be filtered by embodiments of the invention such that tasks not likely to yield fruitful results could be avoided thus sparing computing resources.

The present invention may be embodied in other specific forms without departing from its spirit or essential characteristics. The described embodiments are to be considered in all respects only as illustrative and not restrictive.

What is claimed is:

1. In a computing environment, one or more computer readable storage media, the one or more computer readable storage media comprising:
   a pre-filter data structure for pre-indexing identifiers, wherein the identifiers represent searchable data elements or combinations of data elements in a data store and wherein an identifier being pre-indexed in the data structure indicates that the corresponding data element or combination of data elements may be present in the data store, and wherein absence of the identifier being indexed in the data structure can be used to indicate that the corresponding data element or combination of data elements is not present in the data store, such that when it is known that a data element or combination of data elements does not exist in the data store, expensive search and retrieval operations on the data store can be avoided, the data structure comprising:
   a first field, wherein the first field comprises a first plurality of binary bits, each binary bit corresponding to an identifier,
      wherein a first particular bit in the first plurality of binary bits is set, and wherein the first particular bit corresponds to an identifier generated for a first data element that is stored in the data store, and
      wherein a second particular bit in the first plurality of binary bits is also set, wherein the second particular bit corresponds to an identifier generated for a first combination of data elements that is stored in the data store, the first combination of data elements including the first data element.

2. The one or more computer readable storage media of claim 1, wherein the first combination of data elements includes an attribute.

3. The one or more computer readable storage media of claim 2, wherein the attribute specifies an exact phrase.

4. The one or more computer readable storage media of claim 2, wherein the attribute specifies a near phrase.

5. The one or more computer readable storage media of claim 2, wherein the attribute specifies an unordered phase.

6. The one or more computer readable storage media of claim 2, wherein the attribute specifies a confidence rating.

7. The one or more computer readable storage media of claim 1, wherein the first combination of data elements includes multiple occurrences of the first data element.

8. The one or more computer readable storage media of claim 1, wherein the first combination of data elements further includes one or more data elements related to the first data element.

9. A computer implemented method of creating a gatekeeper data structure that can be used to evaluate the possible existence of a data element or combination of data elements in a collection of data elements that are stored in a data store and can be used to determine absolutely the absence of a data element or combination of data elements from the collection of data elements in the data store, so as to avoid expensive search and retrieval operations on the data store when it is known that the data element or combination of data elements is not included in the data store, the method comprising the following acts that are performed by a processor:
   (a) accessing a collection of data elements that are stored in a data store;
   (b) generating identifiers for at least some of the data elements that are stored in the data store and for combinations of at least some of the data elements;
   (b) allocating a predetermined number of bits in a computer readable medium for a gate-keeper data structure, each of the bits in the gate-keeper data structure corresponding to an identifier; and
   (c) for each of the identifiers generated for the data elements and combinations of data elements, setting the corresponding bit in the gate-keeper data structure.

10. The method of claim 9, wherein generating identifiers for at least some of the data elements and for combinations of at least some of the data elements comprises calculating a hash for each of the at least some data elements and the combinations of at least some of the data elements and using a portion of the calculated hash as the identifier.

11. The method of claim 9, wherein allocating a predetermined number of bits is performed by selecting a number of bits to achieve a certain confidence rating with respect to determining if a data element or a combination of data elements is stored in the collection of data elements.

12. The method of claim 9, wherein the gate-keeper data structure front-ends a full index such that the gate keeper data structure can be consulted to determine either the absence of a data element or combination of data elements from the full index or the possible inclusion of the data element or combination of data elements in the full index and not searching the full index when a data element or combination of data elements is absent from the full index.

13. The method of claim 9, wherein the generated identifiers are numbers.

14. The method of claim 9, wherein generating identifiers for combinations of at least some of the data elements is performed to achieve a certain confidence rating with respect to determining if a data element or a combination of data elements is stored in the collection of data elements.

15. The method of claim 9, wherein the combinations of data elements include at least one set of combinations that each include the same data elements in a different order such that a different identifier is generated for each combination in a set.

16. The method of claim 9, wherein one or more of the generated identifiers are modulos.

17. A computer implemented method of determining if a full index should be searched for a data element or combination of data elements to determine if the data element or combination of data elements is stored in a set of data elements for which the full index exits, the method comprising the following acts that are performed by a processor:

receiving a search string, the search string comprising a plurality of data elements;

for a first combination of data elements in the search string, generating an identifier, the first combination of data elements including one or more of the plurality of data elements in the search string;

at a gatekeeper data structure front ending a full index, wherein the gate keeper data structure comprises a first field, wherein the first field comprises a first plurality of binary bits, each binary bit corresponding to an identifier, determining if a bit corresponding to the identifier generated for the first combination of data elements is set;

for a second combination of data elements in the search string, generating an identifier, the second combination of data elements including at least one of the one or more data elements of the first combination;

at the gate keeper data structure determining if a bit corresponding to the identifiers for the second combination of data elements is set; and as a result of determining that bits are set corresponding to the generated identifiers for the first and second combinations, performing at least one of searching the full index or returning a confidence rating to a user.

* * * * *

UNITED STATES PATENT AND TRADEMARK OFFICE
CERTIFICATE OF CORRECTION

| | |
|---|---|
| PATENT NO. | : 7,644,082 B2 |
| APPLICATION NO. | : 11/681673 |
| DATED | : January 5, 2010 |
| INVENTOR(S) | : Millett et al. |

Page 1 of 3

It is certified that error appears in the above-identified patent and that said Letters Patent is hereby corrected as shown below:

Drawings
Sheet 1, replace Figure 1 with the figure depicted below, wherein the numerical representation table has been changed from "300" to --108--

| | | | Hash | Last 8 bits of hash | Last 5 bits of hash | Hex of last 5 bits |
|---|---|---|---|---|---|---|
| | | fox | 40b8636cf497235c | 01011100 | 11100 | 1C |
| | red | | 100519ba181728d8 | 11011000 | 11000 | 18 |
| | red | fox | f9d6824a13b3ed25 | 00100101 | 00101 | 5 |
| quick | | | b249f6d0e2e948fc | 11111100 | 11100 | 1C |
| quick | | fox | ec45e8c4c06bed36 | 00110110 | 10110 | 16 |
| quick | red | | b0cc990de2fd626d | 01101101 | 01101 | D |
| quick | red | fox | 1c1539fdf2306635 | 00110101 | 10101 | 15 |
| The | | | 1a6a89bc20908b63 | 01100011 | 00011 | 3 |
| The | | fox | 679e70ee245a112d | 00101101 | 01101 | D |
| The | red | | 0ffc1785181760df | 11011111 | 11111 | 1F |
| The | red | fox | 56cf1314b42ff1d1 | 11010001 | 10001 | 11 |
| The | quick | | 00bf13480606058 | 01011000 | 11000 | 18 |
| The | quick | fox | 272dc1de87ccor95 | 10010101 | 10101 | 15 |
| The | quick | red | fe417685c0f445c9 | 11001001 | 01001 | 9 |
| The | quick | red | fox | e63051236b5974196 | 10010110 | 10110 | 16 |

Column 1
Line 27, change "alphabetically" to --alphabetical--

Column 4
Line 35, change "an" to --and--
Line 59, change "parameter" to --parameters--

Signed and Sealed this

Third Day of August, 2010

David J. Kappos
*Director of the United States Patent and Trademark Office*

Column 5
Line 13, change "in" to --is--
Line 26, change "a portions" to --portions--

Column 7
Line 42, change "includes" to --included--
Line 62, change "gate keeper" to --gatekeeper--

Column 8
Line 18, delete "pattern"
Line 37, change "parameter" to --parameters--

Column 9
Line 32, delete "a"
Line 44, change "122" to --102--

Column 10
Line 18, change "data base" to --database--
Line 34, change "read" to --red--
Line 59, delete "Onz X"
Line 63, change "gate keeper" to --gatekeeper--

Column 11
Line 12, delete "." after "frog"
Line 36, change "elements" to --element--
Line 65, change "bits" to --the bits--

Column 12
Line 3, change "increase" to --increases--
Line 11, change "93.75" to --93.75%--
Line 11, change "96.9" to --96.9%--
Line 25, change "1110" to --11100--
Line 26, change "fox" to --fox"--

Column 14
Line 55, delete "." after "frog"

Column 15
Line 9, change "are" to --is--

Column 16
Line 5, change "is" to --is a--
Line 14, change "combination" to --a combination--

Column 17
Line 26, change "is" to --is entered.--
Line 51, change "database. I.e." to --database, i.e.--
Line 62, change "/Packer/_Jonathan 1880's" to --/Packer/_Jonathan_1880's--

CERTIFICATE OF CORRECTION (continued)
U.S. Pat. No. 7,644,082 B2

Column 18
Line 24, change "equates" to --equates to--

Column 21
Line 8, change "patters" to --patterns--
Lines 55-56, change "combination" to --combinations--

Column 22
Line 4, change "may" to --may be--

Column 23
Line 38, change "predone" to --be predone--

Column 26
Line 3, change "exits" to --exists--